United States Patent
Brahmavar

(10) Patent No.: US 10,951,098 B2
(45) Date of Patent: Mar. 16, 2021

(54) METHOD OF MANUFACTURING AN AXIAL FLUX MOTOR

(71) Applicant: Regal Beloit America, Inc., Beloit, WI (US)

(72) Inventor: Subhash Marutirao Brahmavar, Fort Wayne, IN (US)

(73) Assignee: REGAL BELOIT AMERICA, INC., Beloit, WI (US)

(*) Notice: Subject to any disclaimer, the term of this patent is extended or adjusted under 35 U.S.C. 154(b) by 192 days.

(21) Appl. No.: 15/937,016

(22) Filed: Mar. 27, 2018

(65) Prior Publication Data
US 2019/0305655 A1    Oct. 3, 2019

(51) Int. Cl.
| | |
|---|---|
| *H02K 15/03* | (2006.01) |
| *H02K 1/27* | (2006.01) |
| *H02K 7/00* | (2006.01) |
| *H01F 13/00* | (2006.01) |
| *H02K 1/16* | (2006.01) |
| *H02K 5/00* | (2006.01) |

(52) U.S. Cl.
CPC .......... *H02K 15/03* (2013.01); *H01F 13/003* (2013.01); *H02K 1/16* (2013.01); *H02K 1/2713* (2013.01); *H02K 7/003* (2013.01); *H02K 5/00* (2013.01)

(58) Field of Classification Search
CPC .................. H02K 15/03; H02K 1/2766; Y10T 29/49009; Y10T 29/49012; H01F 7/0221
See application file for complete search history.

(56) References Cited

U.S. PATENT DOCUMENTS

| | | | |
|---|---|---|---|
| 6,847,285 B2 | 1/2005 | Sirois et al. | |
| 6,867,525 B2 | 3/2005 | Ionel et al. | |
| 7,148,598 B2 | 12/2006 | Ionel et al. | |
| 7,157,827 B2 | 1/2007 | Heideman et al. | |
| 7,332,845 B2 | 2/2008 | Heideman et al. | |
| 7,415,756 B2 * | 8/2008 | Ishida | F04B 35/04 29/596 |
| 7,521,834 B2 | 4/2009 | Patterson et al. | |
| 7,638,913 B2 | 12/2009 | Ionel et al. | |
| 7,654,123 B2 | 2/2010 | Patterson et al. | |
| 8,061,171 B2 | 11/2011 | Patterson et al. | |
| 8,598,761 B2 | 12/2013 | Langford et al. | |
| 8,878,470 B2 | 11/2014 | Camilleri et al. | |
| 8,946,960 B2 | 2/2015 | Camilleri et al. | |
| 9,041,264 B2 | 5/2015 | Langford et al. | |

(Continued)

*Primary Examiner* — Minh N Trinh
(74) *Attorney, Agent, or Firm* — Armstrong Teasdale LLP

(57) ABSTRACT

A method of manufacturing an axial flux motor includes providing a stator; providing a rotor having a first external face and a second external face opposed and parallel the first external face; rotatably securing the rotor to the stator about a rotor center of rotation; providing a permanent magnet having a longitudinal axis thereof; fixedly securing the magnet to the rotor with the longitudinal axis positioned in a radial direction relative to the rotor center of rotation and so defining radially inward surface and an opposed radially outward surface, the magnet having a first face adjacent the first external face of the rotor and having a second face adjacent the second external face of the rotor; partially magnetizing the magnet by positioning a first magnetizing device adjacent the first face of the magnet; and magnetizing the magnet by positioning a second magnetizing device adjacent the second face of the magnet.

8 Claims, 14 Drawing Sheets

(56) References Cited

U.S. PATENT DOCUMENTS

| | | | |
|---|---|---|---|
| 9,099,905 B2 | 8/2015 | Manz et al. | |
| 9,246,364 B2 | 1/2016 | Brahmavar et al. | |
| 9,362,792 B2 | 6/2016 | Figgins et al. | |
| 9,467,030 B2 | 10/2016 | Camilleri et al. | |
| 9,831,727 B2 | 11/2017 | Brahmavar et al. | |
| 9,837,867 B2 * | 12/2017 | Brahmavar | H02K 1/2793 |
| 9,882,440 B2 | 1/2018 | Kingery et al. | |
| 2013/0038162 A1 | 2/2013 | Pan | |
| 2013/0134818 A1 * | 5/2013 | Jan | H02K 29/03 |
| | | | 310/156.32 |
| 2014/0265653 A1 * | 9/2014 | Heins | H02K 21/24 |
| | | | 310/51 |
| 2015/0061441 A1 | 3/2015 | Figgins et al. | |
| 2016/0111925 A1 | 4/2016 | Brahmavar et al. | |
| 2019/0305655 A1 * | 10/2019 | Brahmavar | H02K 1/148 |

* cited by examiner

METHOD OF MANUFACTURING AN AXIAL FLUX MOTOR

CROSS-REFERENCE TO RELATED APPLICATIONS

Cross reference is made to the following application 17-FW-011-UPA1 Titled "AXIAL FLUX ROTOR AND AXIAL FLUX ELECTRIC MACHINE" filed on Mar. 27, 2018 and filed concurrently herewith which is incorporated herein by reference in its entirety.

BACKGROUND OF THE INVENTION

The field of the invention relates generally to electrical machines, and more particularly, to axial flux electric motors having an axially imbedded permanent magnet rotor One of many applications for an electric motor is to propel fluids, for example to blow air with a fan or blower, as in heating or cooling, and, for example, for pumping a liquid, such as water, to recirculate water in a pool or spa. The electric motor may be configured to rotate an impeller within a pump or blower, which displaces a fluid, causing a fluid flow. Many gas burning appliances include an electric motor, for example, water heaters, boilers, pool heaters, space heaters, furnaces, and radiant heaters. In some examples, the electric motor powers a blower that moves air or a fuel/air mixture through the appliance. In other examples, the electric motor powers a blower that distributes air output from the appliance.

A common motor used in such systems is an alternating current (AC) induction motor. Typically, the AC induction motor is a radial flux motor, where the flux extends radially from the axis of rotation. Another type of motor that may be used in the application described above is an electronically commutated motor (ECM). ECMs may include, but are not limited to, brushless direct current (BLDC) motors, permanent magnet alternating current (PMAC) motors, and variable reluctance motors. Typically, these motors provide higher electrical efficiency than an AC induction motor. Some ECMs have an axial flux configuration in which the flux in the air gap extends in a direction parallel to the axis of rotation of the rotor.

Typically, such ECM motors, to obtain sufficient efficiency, utilize rotors with permanent magnets provide high efficiencies that induction motor. To further improve their efficiencies, such ECM motors often utilize rare earth magnets that, while improving efficiency are very expensive and are obtainable from only very limited locations. Obtaining improved motor efficiency without the need for rare earth magnets is desired.

Typically, such ECM motors are provided with permanent magnets that are made of a permanently magnetizable material that has been magnetized prior to the assembly of the magnets into the rotor. The magnetized magnets when being assembled into the assembly of such a rotor have an affinity to material that is magnetically attracted, for example ferrous materials. Typically portions of the stator core, including the stator core and portions of the rotor, including the rotor poles are made of ferrous materials. Also, the motor housing, the motor bearings and the motor shaft are typically made of ferrous materials. The attraction of the magnets to these ferrous materials makes assembly very difficult. Solving the problems associated with these permanent magnet assembly is desired.

BRIEF DESCRIPTION OF THE INVENTION

In one aspect, a method of manufacturing an axial flux motor is provided. The method includes providing a stator; providing a rotor having a first external face and a second external face opposed and parallel to the first external face; rotatably securing the rotor to the stator about a rotor center of rotation; providing a magnetizable permanent magnet having a longitudinal axis thereof; fixedly securing the magnet to the rotor with the longitudinal axis positioned in a radial direction relative to the rotor center of rotation and so defining radially inward surface and an opposed radially outward surface, the magnet having a first face adjacent the first external face of the rotor and having a second face adjacent the second external face of the rotor; partially magnetizing the magnet by positioning a first magnetizing device adjacent the first face of the magnet; and further magnetizing the magnet by positioning a second magnetizing device adjacent the second face of the magnet.

In another aspect, the axial flux rotor may be provided wherein the step of providing a rotor includes the step of providing a body having an outer periphery limited by an outside radius OR. The body further has a central opening limited by an inner radius IR. The step of providing a body includes stamping a plurality of laminations. Each of the plurality of laminations including opposed parallel external planar faces and opposed first and second ends. The step of providing a body also includes overlying one of the external planar faces of one of the plurality of laminations over one of the external planar faces of another of the plurality of laminations.

The step of providing a body also includes repeating the overlying step above to provide a rotor pole. The step of providing a body also includes positioning the rotor poles in a spaced apart relationship with the opposed first and second ends of the laminations tangentially oriented with respect to the rotor center of rotation. The opposed first and second ends define the outside radius OR and the inside radius IR, respectively.

In another aspect, the axial flux rotor may be provided wherein the step of providing a body further includes overmolding rotor poles with a moldable material after positioning the rotor poles in the spaced apart relationship.

In yet another aspect, the axial flux rotor may be provided wherein the step of providing a magnetizable permanent magnet includes providing one of a ferrite magnet, a bonded neodymium magnet and a sinter neodymium magnet.

In yet another aspect, the axial flux rotor may be provided further including the step of providing a second magnetizable permanent magnet having a longitudinal axis thereof and the step of fixedly securing the second magnetizable permanent magnet to the rotor with the longitudinal axis positioned in a radial direction relative to the rotor center of rotation and so defining a second magnet radially inward surface and an opposed second magnet radially outward surface. The second magnet may have a first face adjacent the first external face of the rotor and may have a second face adjacent the second external face of the rotor.

In yet another aspect, the axial flux rotor may be provided further including the step of partially magnetizing the second magnet by positioning the first magnetizing device adjacent the first face of the second magnet and the step of further magnetizing the second magnet by positioning the second magnetizing device adjacent the second face of the second magnet.

In yet another aspect, the axial flux rotor may be provided wherein the step of providing a magnetizable permanent magnet having a longitudinal axis thereof includes providing a plurality of magnetizable permanent magnets, each of the plurality of magnetizable permanent magnets having a longitudinal axis thereof;

In yet another aspect, the axial flux rotor may be provided wherein the step of fixedly securing the magnet to the rotor includes fixedly securing each of the plurality of magnetizable permanent magnets to the rotor with the longitudinal axis of each of the plurality of magnetizable permanent magnets positioned in a radial direction relative to the rotor center of rotation and so defining a radially inward surface and an opposed radially outward surface of each of the plurality of magnetizable permanent magnets. Each of the plurality of magnetizable permanent magnets may have a first face adjacent the first external face of the rotor and may have a second face adjacent the second external face of the rotor.

In yet another aspect, the axial flux rotor may be provided wherein the step of partially magnetizing the magnet includes positioning the first magnetizing device adjacent the first face of each of the plurality of magnetizable permanent magnets and wherein the step of further magnetizing the magnet includes positioning the second magnetizing device adjacent the second face of each of the plurality of magnetizable permanent magnets.

In yet another aspect, the axial flux rotor may be provided wherein the step of providing a magnetizable permanent magnet includes providing an axially imbedded magnet having a minimum depth defined by the equation $$D_{min} = \frac{\pi * (OR + IR)}{2 * N * BrA} * BrS,$$

wherein BrS is the Remnant Flux Density of Surface Mounted Magnet, wherein OR is the outside radius of the body, wherein IR is the inner radius of the body, wherein N is the number of rotor poles, and wherein BrA is the Remnant Flux Density of Axially Imbedded Magnet.

In yet another aspect, the axial flux rotor may be provided wherein the step of providing a magnetizable permanent magnet includes providing a magnetizable ring/disc positioned proximate one of the first and second opposed faces, the ring defines an outer periphery and a central opening In yet another aspect, the axial flux rotor may be provided wherein the step of providing a rotor includes the step of providing a body having an outer periphery limited by an outside radius OR.

In yet another aspect, the axial flux rotor may be provided wherein the body further has a central opening limited by an inner radius IR.

In yet another aspect, the axial flux rotor may be provided wherein, the step of providing a body includes providing a sheet of ferrous material, punching spaced apart openings in the sheet, and wrapping the sheet in a circular form to form a laminated rotor core while aligning some of the spaced apart opening to provide cavities for receiving the magnets and to provide rotor poles in a spaced apart relationship with the opposed parallel external faces of the laminations tangentially oriented with respect to the rotor center of rotation. The external faces define the outside radius OR and the inside radius IR.

In yet another aspect, a method of manufacturing an axial flux rotor is provided. The method includes the step of stamping a plurality of laminations and the stop of overlying one of the external planar faces of one of the plurality of laminations over one of the external planar faces of another of the plurality of laminations. Each of the plurality of laminations includes opposed parallel external planar faces and opposed first and second ends. The method also includes the step of overlying one of the external planar faces of one of the plurality of laminations over one of the external planar faces of another of the plurality of laminations, repeating the overlying step above to provide a rotor pole, and positioning the rotor poles in a spaced apart relationship around a rotor center of rotation with the opposed first and second ends of the laminations tangentially oriented with respect to the rotor center of rotation.

In yet another aspect, the method may further include the steps of providing a plurality of magnetizable permanent magnets, each magnet having a longitudinal axis thereof and positioning each of the magnets between adjacent rotor poles with the longitudinal axis positioned in a radial direction relative to the rotor center of rotation and so defining radially inward surface and an opposed radially outward surface. The magnet has a first face adjacent the first external face of the rotor and has a second face adjacent the second external face of the rotor.

In yet another aspect, the method may further include the step of overmolding the rotor poles with a moldable material after positioning the rotor poles in the spaced apart relationship.

In yet another aspect, the method may further include the steps of partially magnetizing the magnet by positioning a first magnetizing device adjacent the first face of the magnet and further magnetizing the magnet by positioning a second magnetizing device adjacent the second face of the magnet.

In yet another aspect, the method may be provided wherein the step of providing a plurality of magnetizable permanent magnets includes providing one of ferrite magnets, bonded neodymium magnets and sintered neodymium magnets.

In yet another aspect, the method may be provided wherein the positioning the rotor poles in a spaced apart relationship includes positioning each of the plurality of laminations such that the laminations form a body have an outer periphery defined by an outside radius OR, and a central opening defined by an inner radius IR.

In yet another aspect, the method may be provided wherein the step of providing a magnetizable permanent magnet includes providing a magnet having a minimum length defined by the equation $$D_{min} = \frac{\pi * (OR + IR)}{2 * N * BrA} * BrS,$$

wherein BrS is the Remnant Flux Density of Surface Mounted Magnet, wherein OR is the outside radius of the body, wherein IR is the inner radius of the body, wherein N is the number of rotor poles, and wherein BrA is the Remnant Flux Density of Axially Imbedded Magnet.

In yet another aspect, the method may further include the step of providing a magnetizable ring/disc positioned proximate one of the first and second opposed faces. The ring defines an outer periphery and a central opening.

In yet another aspect, an axial flux rotor, for use in an axial flux motor prepared by a process, is provided. The process includes the steps of stamping a plurality of laminations and overlying one of the external planar faces of one of the plurality of laminations over one of the external planar faces of another of the plurality of laminations. Each of the plurality of laminations includes opposed parallel external planar faces and opposed first and second ends. The process also includes the steps of repeating the overlying step above to provide a first rotor pole, repeating the above steps to provide at least one addition rotor pole, thereby providing a plurality of rotor poles, positioning the plurality of rotor poles in a spaced apart relationship around a rotor center of rotation with the opposed first and second ends of the laminations tangentially oriented with respect to the rotor center of rotation, providing a plurality of magnetizable permanent magnets, each magnet having a longitudinal axis thereof, positioning each of the magnets between adjacent rotor poles with the longitudinal axis positioned in a radial direction relative to the rotor center of rotation and so defining radially inward surface and an opposed radially outward surface, the magnet having a first face adjacent the first external face of the rotor and having a second face adjacent the second external face of the rotor, and overmolding rotor poles with a moldable material after positioning each of the magnets between adjacent rotor poles.

In yet another aspect, the process may be provided wherein the step of positioning the rotor poles in a spaced apart relationship include providing positioning the rotor poles in a spaced apart relationship to form a body having an outer periphery defined by an outside radius OR, having and a central opening defined by an inner radius IR and wherein the step of providing a plurality of magnetizable permanent magnets includes providing a providing a plurality of magnetizable permanent magnets, each magnet having a minimum length defined by defined by the equation $$D_{min} = \frac{\pi * (OR + IR)}{2 * N * BrA} * BrS,$$

wherein BrS is the Remnant Flux Density of Surface Mounted Magnet, wherein OR is the outside radius of the body, wherein IR is the inner radius of the body, wherein N is the number of rotor poles, and wherein BrA is the Remnant Flux Density of Axially Imbedded Magnet.

In yet another aspect, the process may further include the step of providing a magnetizable ring/disc positioned proximate one of the first and second opposed faces. The ring defines an outer periphery and a central opening.

DETAILED DESCRIPTION OF THE INVENTION

Figure 1:
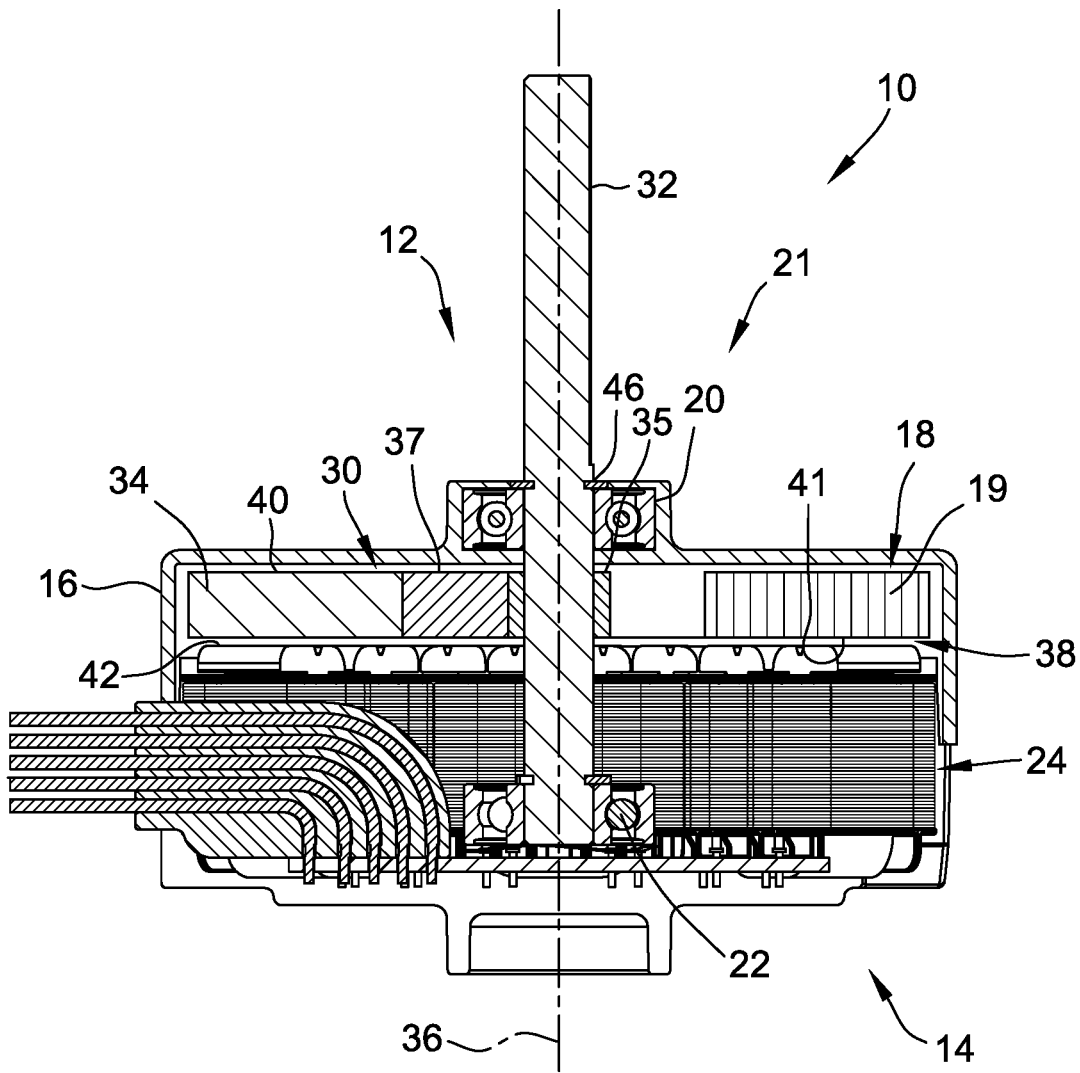
FIG. 1 is a cross-sectional view of an exemplary axial flux machine.
Figure 2:
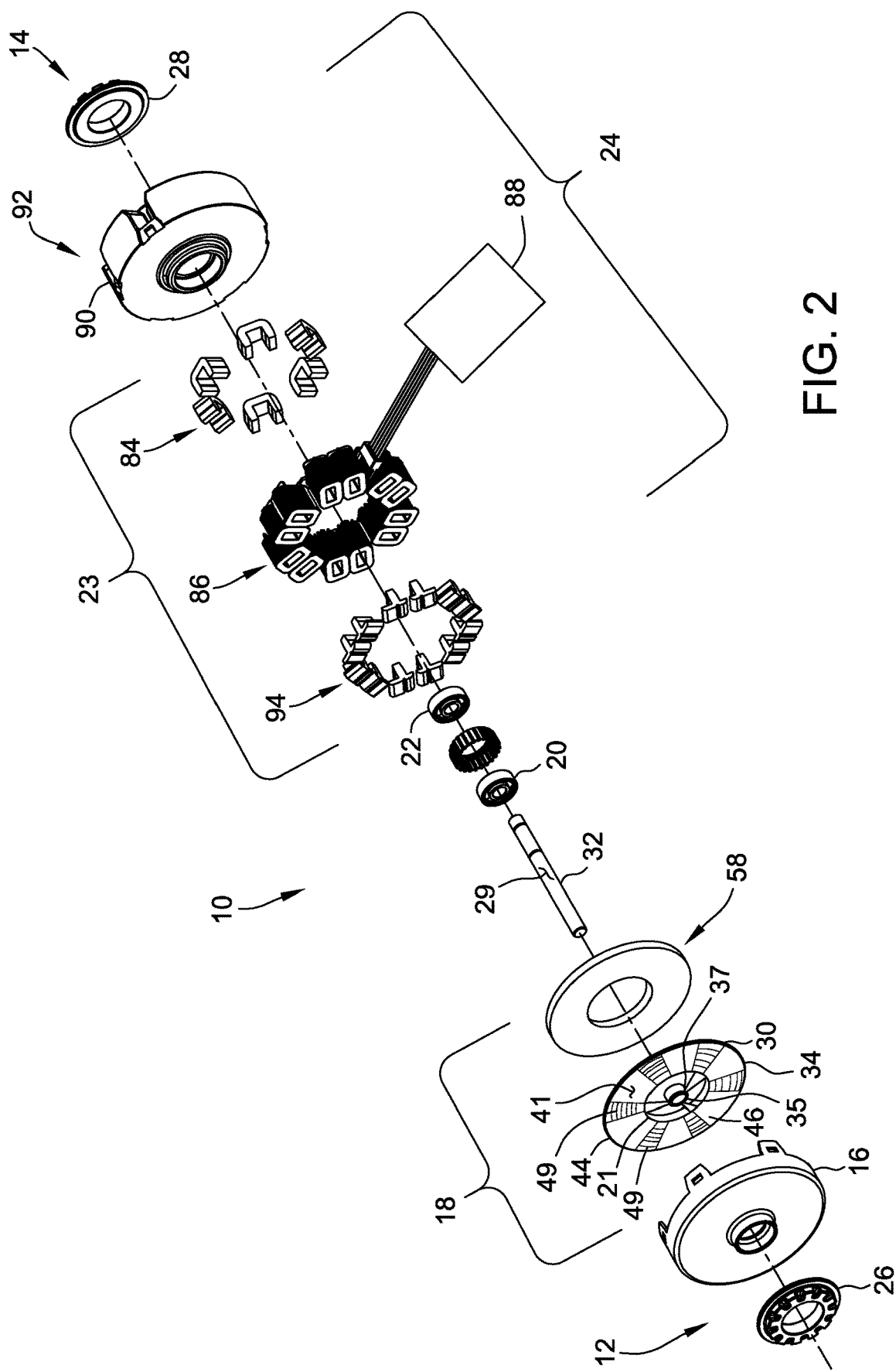
FIG. 2 is an exploded view of the axial flux machine shown in FIG. 1.

FIG. 1 is a cross-sectional view of an exemplary axial flux electric machine 10. FIG. 2 is an exploded view of axial flux electric machine 10. Components common to FIGS. 1 and 2 are identified with the same reference numerals. In the exemplary embodiment, electric machine 10 is an electric motor having a first end 12 and a second end 14. Alternatively, electric machine 10 may operate as an electric generator. Axial flux electric machine 10 may generally include a housing 16, a rotor assembly 18, a first bearing assembly 20, a second bearing assembly 22, and a stator assembly 24. A first end mount 26 is coupled to housing 16 at machine first end 12 and a second end mount 28 is coupled to stator assembly 24 at machine second end 14.

As shown in FIGS. 1-4, the electric machine 10 may be an axial flux motor. The machine 10 includes a housing 16 and a stator 23 fixedly secured to the housing 16. The stator 23 may be a part of a stator assembly 24.

The machine 10 also includes the rotor in the form of, for example rotor assembly 18 that is rotatably secured to the housing 16. The rotor assembly 18 may include a body or rotor core 30 that defines an axis of rotation 36 of the body 30. The body 30 has first and second opposed faces or surfaces, 40 and 41, respectively.

Figure 4:
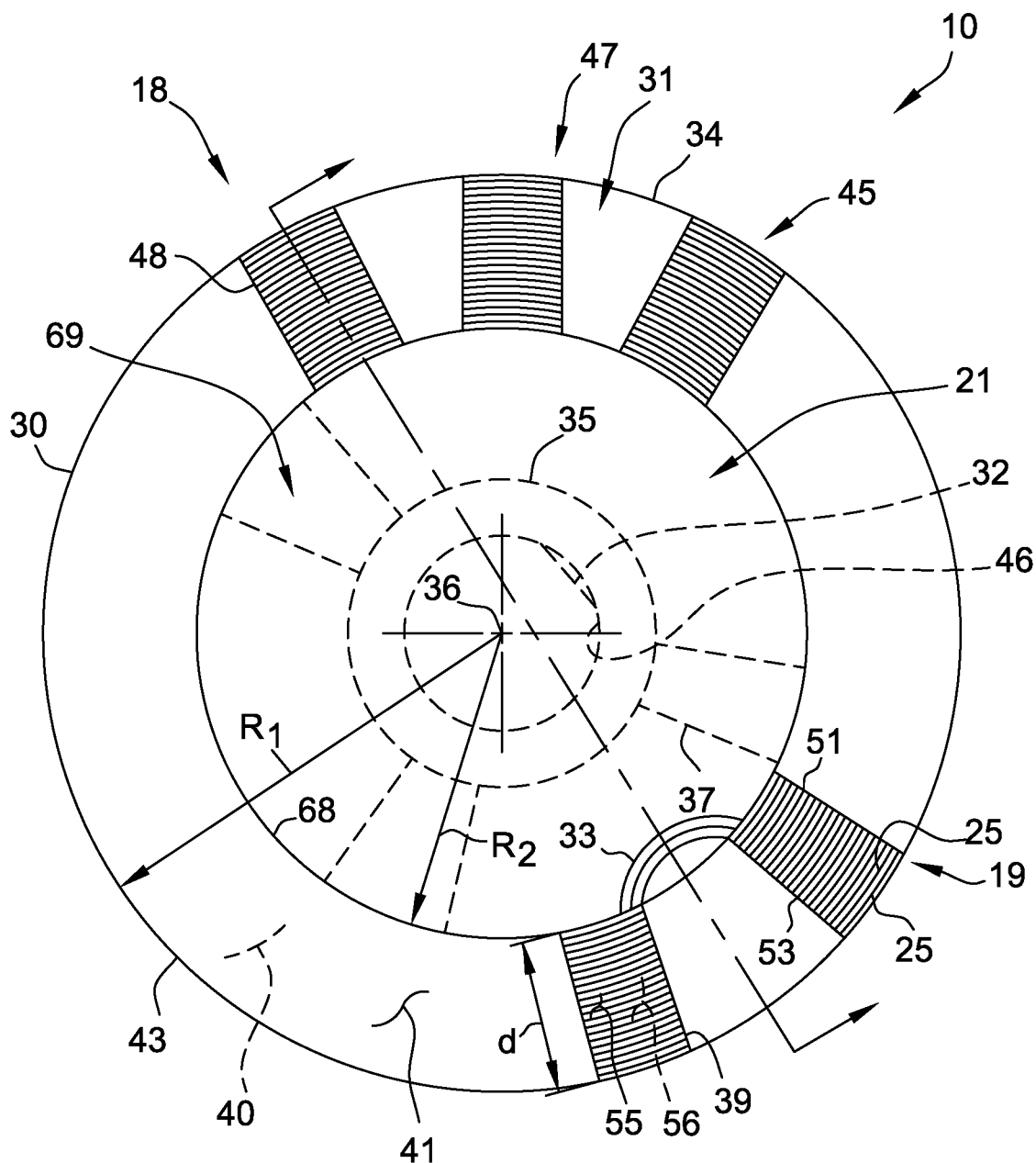
FIG. 4 is a plan view of the rotor of the axial flux machine shown in FIGS. 1 and 2.
Figure 4A:
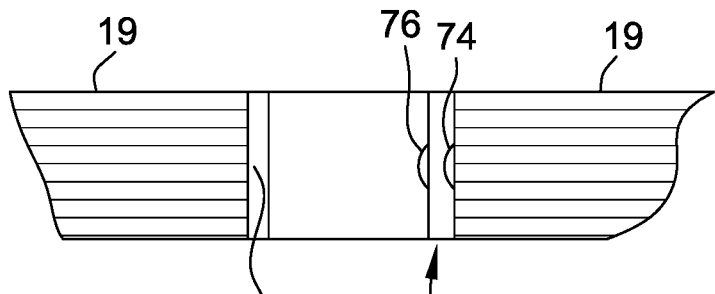
FIG. 4A is a partial cross sectional view of the rotor of FIG. 4 showing the magnet in a pocket.
Figure 5:
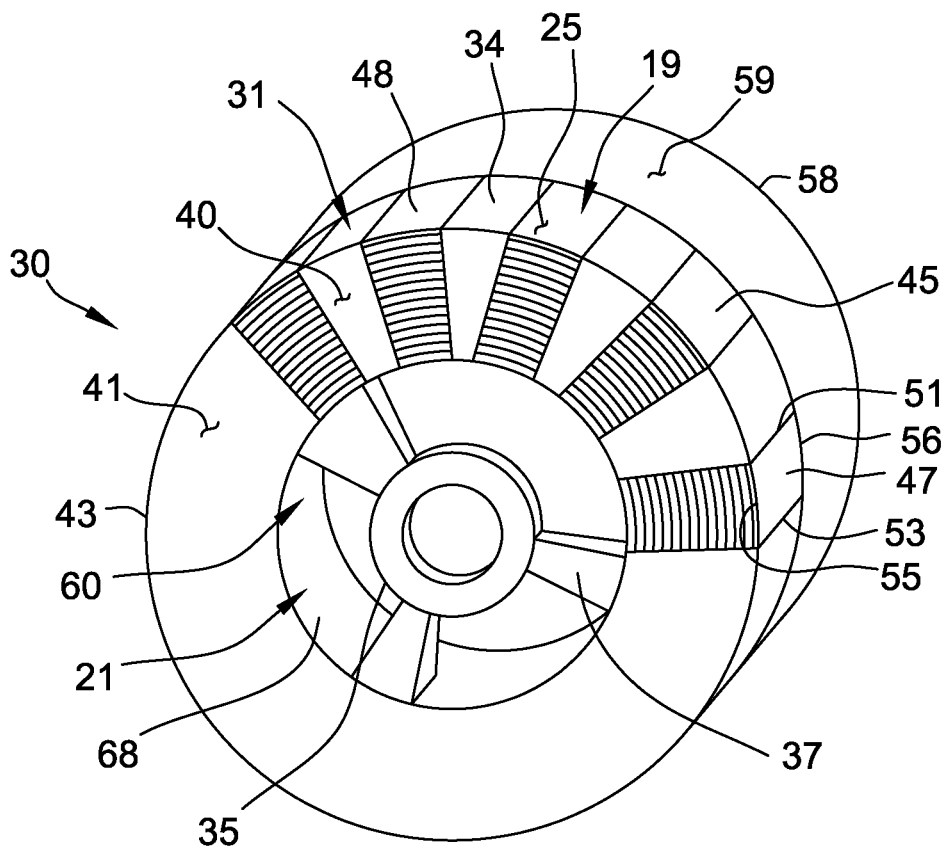
FIG. 5 is a perspective view of another embodiment of the present invention in the form of a rotor that may be used in an axial flux machine and having a magnetic ring.

As shown in FIGS. 4, 4A and 5, the body 30 defines a plurality of pockets 31 formed in the body 30. The body 30 may be made of any suitable material and be manufactured using any available manufacturing process. For example, rotor 30 may be fabricated using a sintered process from an Soft Magnetic Alloy (SMA), from Soft Magnetic Composite (SMC) materials, and/or from a powdered ferrite material.

To minimize eddy current losses the electrical current path along the magnetic flux lines 33 may be interrupted in a suitable manner.

For example and as shown in FIG. 4, the body 30 may be formed of a plurality of sheets or laminations 48. Each sheet may be coated on its faces 25 with a non-electrically conductive coating 27. While the sheets 48 may each have a different thickness, for simplicity, each of the sheets has a generally uniform thickness. Each of the plurality of sheets defines the opposed faces 25.

Each of the plurality of sheets 48 contacts one of the opposed faces 25 of at least one other of the plurality of sheets 48. The rotor assembly 18 also has a plurality of spaced apart magnets 34. Each of the plurality of magnets 34 is matingly fitted to one of the plurality of pockets 31.

While the sheets may form a contiguous core 30 and the magnets 34 may be fitted to the core 30, it should be appreciated that some of the sheets may be combined to form a pole 19 with the sheets of each pole being spaced from the sheets of the other poles. In such a configuration a bonding material, such as a resin 39 may be used to interconnect all the components forming the rotor assembly 18. In such a configuration, the core 30 may include a central portion 21. The central portion 21 may support a central rotor shaft 32 and the poles 19 and the magnets 34 may extend from core outer periphery 43 to the central portion 21 of the core 30.

The rotor assembly 18 may be manufactured by placing the poles 19, the magnets 34 and the shaft 32 in a resin mold (not shown) and injecting resin in to mold, bonding the magnets 34, the shaft 32 and the poles 19 together to form the rotor assembly 18. Note that the shaft 32 not placed in the mold and, rather, may be later assembled into the rotor assembly 18

As shown in FIGS. 1-4, the axial flux machine 10 may be provided wherein the rotor or rotor core 30 is substantially cylindrical and includes a plurality of rotor poles 19.

As shown in FIGS. 1-4, rotor assembly 18 may include the rotor core 30 coupled to shaft 32, and a plurality of permanent magnets 34 may be coupled to rotor 30. For example, permanent magnets, fabricated from neodymium, ferrite or other materials, may be surface mounted to a face of the rotor core 30. Alternatively, the permanent magnets may be fabricated from neodymium, ferrite or other materials, and may be formed as an annular magnet with alternating magnetized segments. However, any suitable permanent magnet shape and material may be used that enables electric machine 10 to function as described herein. It should be appreciated that the radially extending magnets 34 described hereinafter have the advantage of enhanced magnetic flux for a given magnetic material mass.

Rotor assembly 18 is rotatable within housing 16, and more specifically, rotatable within first bearing assembly 20 and second bearing assembly 22 about an axis of rotation 36. It should be appreciated that other support schemes may be possible for supporting the rotating rotor assembly within the housing. For example, a single bearing assembly (not shown) may be used and may be located where the first bearing assembly or where the second bearing assembly is located.

In the exemplary embodiment, rotor core 30 includes outer periphery 43 and a shaft central opening or inner periphery 46 having a diameter corresponding to the diameter of shaft 32. In the exemplary embodiment, rotor 30 includes a plurality of laminations 48 that are either interlocked or loose. For example, laminations 48 are fabricated from multiple punched layers of stamped metal such as steel.

Alternatively, rotor 30 may be fabricated using a sintered process from an SMC material, an SMA material, and/or a powdered ferrite material. Alternatively, rotor 30 may be fabricated using a sintered process from an SMC material, an SMA material, and/or a powdered ferrite material. Alternatively, rotor 30 is machined and/or cast from any suitable material. In the exemplary embodiment, rotor assembly 18 is driven by an electronic control (not shown), for example, a sinusoidal or trapezoidal electronic control including control board 88 (see FIG. 2).

As shown in FIGS. 4, 4A, 4B, 4C, and 4D, the rotor assembly 18 may include the rotor core 30. The rotor core 30, as shown in FIG. 4, is generally ring shaped. The rotor core 30 further includes a radially outward peripheral ring having an outer wall or surface 43 that has a first or outer radius R1 and a radially inward peripheral surface or inner wall 68 defining a central opening 69 that has a second or inner radius R2.

The inner wall may, alternatively, extend to the outer periphery 29 of shaft 32 so that the shaft 32 may support core 30. In another alternative, the inner wall 68 may be spaced from shaft 32 with central portion 21 including for example a sleeve 35 (shown in dashed lines) engaging the shaft 32 and a hub 37 including plurality of arms or spokes (shown in phantom lines) connecting the sleeve 35 to the inner wall 68.

The core 30, as shown in FIG. 4, extends from outer periphery 43 to inner wall 68. The poles 19 are formed from the sheets 48 and are positioned in a spaced apart relationship in the core 30, forming portions of the inner wall 68 and the outer periphery 43. The sheets or laminations 48 are positioned tangentially around the core 30 so that flux lines 33 pass normally across the sheets or laminations 48.

The spaces between the poles define pockets 31 for receiving the magnets 34. The at least one of the plurality of pockets 31 includes a minimum depth $D_{min}$ defined by the equation $$D_{min} = \frac{\pi * (OR + IR)}{2 * N * BrA} * BrS,$$

wherein N is the number of rotor poles 19.

Figure 4B:
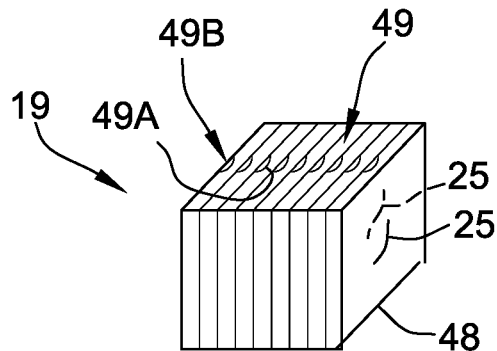
FIG. 4B is a perspective view of a pole used in the rotor of FIG. 4.

The axial flux machine 10 may be provided wherein each sheet 48 is in the form of a layer or lamination. Each of the laminations 48 includes opposed parallel external planar faces 25. The laminations may have any suitable shape. For example, the laminations may extend circumferentially around the central portion 21 of the rotor core 30 and the core 30 may include the pockets or axial apertures 31 formed in the laminations 48. For simplicity and as shown in FIGS. 4 and 4B, the laminations 48 may consists of separate portions that are spaced circumferentially about the central portion 21 of the rotor core 30. Each portion may form one of the poles or teeth 19 of the rotor core 30.

Figure 4C:
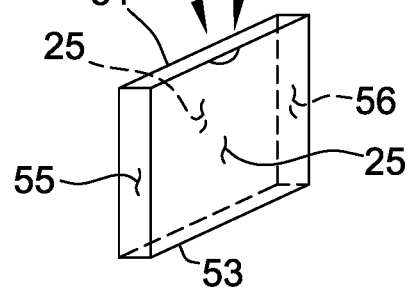
FIG. 4C is a perspective view of a lamination for use in the magnetic pole of FIG. 4B.
Figure 4D:
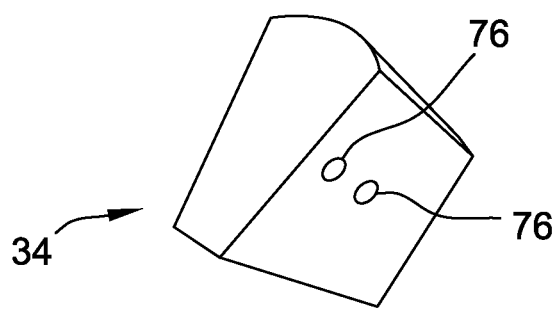
FIG. 4D is a perspective view of a magnet used in the rotor of FIG. 4

As shown in FIG. 4C, the laminations 48 may be rectangularly shaped or trapezoidal shaped, and may form one of the poles or teeth 19 with opposed first and second sides 51 and 53, respectively, normal to the external planar faces 25 and with opposed first and second ends 55 and 56, respectively, normal to both the external planar faces 25 and the ends 55 and 56. Note that when utilizing the laminations 48 as shown in FIGS. 4 and 4C, the axial apertures 31 are created in the space between adjacent laminations 48.

The magnets 34 are positioned against the sides 51 and 53. The first and second ends 55 and 56 form the first face 40 and the second face 41, respectively of the rotor outer surface. An external planar face 25 of at least one of the laminations 48 is positioned over the external planar face 25 of another of the laminations 48 to form a first rotor pole 45. Additional laminations, for example 3 to 25 laminations be so positioned to form the first rotor pole 45.

An external planar face 25 of at least one of the laminations 48 is positioned over the external planar faces 25 of another of the laminations 48 to form a second rotor pole 47. Additional laminations, for example 3 to 25 laminations may be so positioned to form the second rotor pole 47. The first and second rotor poles 45 and 47, respectively, are spaced apart and secured to bonding material 39, such as a molded polymer or a resin.

As shown in FIG. 4B and FIG. 4C, mechanical interlocks 49 may be formed in the laminations 48 and may for example be in the form of protrusions 49A in one lamination that mate with pockets 49B in another lamination. Such interlocks 49 are more fully described in U.S. Pat. No. 6,847,285 B2 assigned to the same entity as the instant application, hereby incorporated in its entirety by reference.

As shown in FIG. 4, the rotor assembly 18 may, as shown include additional rotor poles 19, fabricated as described above from the laminations 48. The first pole 45, the second pole 47 and the addition poles 19 may be positioned in a mold (not shown) of a molding machine (not shown), preferably in a circular pattern and evenly positioned about a periphery of the mold. The permanent magnets 34 may be positioned in the mold between adjacent poles 19. The sleeve 35 and the hub 37 (as well as shaft 32) may also be placed in the mold. Next molding material may be injected into the mold to form the rotor assembly. It should be appreciated that the sleeve 35 and the hub 37 may be integrally formed by the molding material in the mold.

In the exemplary embodiment, rotor 30 includes a plurality of axial apertures 31. For example, a first side 51 and a second side 53 define a first axial aperture or pocket 31 of the plurality of axial apertures or pockets 31. Each axial aperture 31 includes a depth d extending axially inwardly from rotor core periphery 43 to rotor core inner wall 68 and extends axially through rotor 30 from rotor outer surface 40 to an opposite second rotor outer face or surface 41. Each axial aperture 31 may be configured to receive one or more permanent magnets 34 such that each magnet is axially embedded in rotor 30 and extends inwardly from rotor outer surface 43 to inner wall or surface 68. In the exemplary embodiment, permanent magnets 34 are substantially rectangular shaped hard ferrite magnets. However, magnets 34 may have any suitable shape and be fabricated from any suitable material that enables machine 10 to function as described herein. For example, magnets 34 may be tapered and/or fabricated from bonded neodymium, sintered neodymium, and/or samarium cobalt.

In the exemplary embodiment, rotor 30 includes a plurality of rotor poles 19 each having an outer surface along rotor outer periphery 43 and extending radially inwardly to inner wall 68. Although illustrated as generally rectangular in FIG. 4 and FIG. 5, rotor poles 19 may have any suitable shape that enables machine 10 to function as described herein. For example, rotor poles 19 may be have a generally rectangular shape. In the exemplary embodiment, the number of axial apertures 31 is equal to the number of rotor poles 19, and one magnet 34 is positioned within each axial aperture 31 between a pair of rotor poles 19. Rotor 30 may have any number of rotor poles 19 that enables electric machine 10 to function as described herein, for example, six, eight, ten or twelve poles.

In the exemplary embodiment, the design of rotor 30 utilizes lower-cost magnets, yet achieves the power densities and high efficiency of machines using higher-cost magnets such as neodymium magnets. In the exemplary embodiment, increased efficiency and power density of machine 10 is obtained by increasing the flux produced by rotor 30. Increased flux generation is facilitated by magnets 34 having a minimum depth d, which is defined by the equation:

$$D_{min} = \frac{(\pi * (R1 + R2))}{2*n} * BrS/BrA$$

wherein $D_{min}$ represents the minimum depth variable, R1 represents the rotor outer radius, R2 represents the rotor inner radius, and n represents the number of rotor poles. Maximum depth $D_{max}$ is determined by saturation considerations of stator iron sections (teeth and yoke) and any axial length constraints on the machine 10 being designed in a specific application. In the exemplary embodiment, rotor 30 facilitates increased flux production resulting in optimum efficiency and power density when magnets 34 have a depth between $D_{min}$ and $D_{max}$. In the exemplary embodiment, depth d may be variably selected between $D_{min}$ and $D_{max}$ to adjust the power output of machine 10 while maintaining a constant rotor and stator outer diameter. For example, decreasing depth d lowers motor power output and increasing depth d increases motor output. As such, machine 10 may be designed for a specific power output application without additional tooling costs to adjust the outer diameter of the rotor and/or stator.

FIG. 4 is a front view of rotor 30 that may be included within electric machine 10. Rotor 30 generally includes sleeve 35 for engagement with shaft 32, and a hub 37 positioned between sleeve 35 and rotor poles 19. In the exemplary embodiment, sleeve 35 is fabricated from steel. However, sleeve 35 may be formed from any suitable material that enables rotor 30 to function as described herein. Alternatively, sleeve 35 may be excluded and hub 37 is directly coupled to shaft 32. In the exemplary embodiment, hub 37 is fabricated from an injection molded polymer. However, hub 37 may be formed from any suitable non-magnetic material that enables rotor 30 to function as described herein. For example, hub 37 may be machined, extruded or die cast non-magnetic material such as aluminum or zinc. Alternatively, hub 37 is fabricated from an isolation damping material configured to reduce transmission of at least one of motor torque pulsations, motor torque ripple, and motor torque cogging.

In the exemplary embodiment and as shown in FIGS. 4B and 4C, rotor poles 19 may also include pole retention features 74 in the form of protrusions and/or indentations that mate with mating magnet retention features 76 in the form of indentations and/or protrusion formed in the magnets 34 to facilitate retention of magnets 34 within axial apertures 31 by substantially preventing movement of magnets 34 in a radial direction. Further, the rotor poles 19 and the magnets 34 may define a space 80 between each other. In the exemplary embodiment, the space 80 is configured to receive bonding material 39, for example a retention material, such as a molded polymer or a resin. The bonding material 39 may substitute or augment the retention features 74 and 76.

The bonding or retention material 39, which is configured to at least partially fill space 80 and cause interference between the surface features 74 and 76 to substantially resist or prevent movement of magnets 34 within axial apertures 31. Retention material 39 may be any material or member that at least partially fills space 80 and facilitates preventing radial movement of magnets 34 and/or general side-to-side motion. Further, retention material 39 such as non-magnetic polymer may be injection molded into the region between rotor poles 19 and magnets 34 to facilitate retention of magnets 34 within axial apertures 31.

Referring again to FIG. 1, an air gap 38 is formed between rotor second outer face or surface 41 and a stator outer surface 42, and a magnetic flux within machine 10 extends between permanent magnets 34 and stator assembly 24 in a direction parallel to axis 36.

Figure 5B:
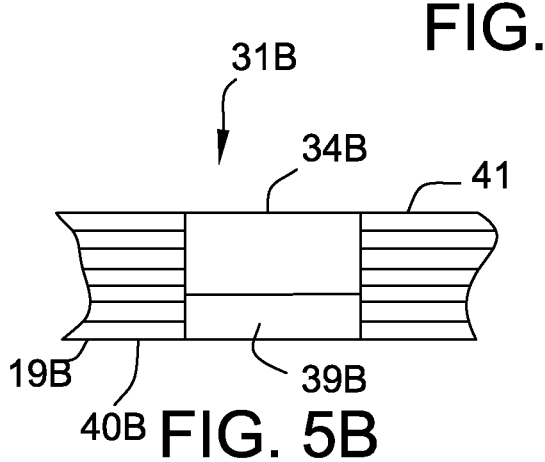
FIG. 5B is a partial cross sectional view of a rotor similar to the rotor of FIG. 5 showing a magnet in a pocket that does not extend from the first face to the second face of the rotor.
Figure 5A:
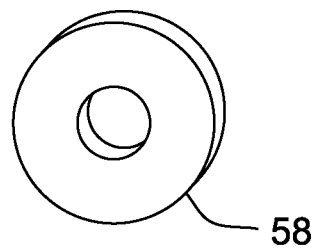
FIG. 5A is a perspective view of the magnetic ring of the rotor of FIG. 5.

Referring now to FIG. 5 and FIG. 5A, in yet another aspect, the axial flux motor 10 may be provided wherein the rotor assembly 18 further includes a magnetizable ring 58 positioned proximate the rotor first face 40 (opposed to stator 23). The ring 58 defines an outer periphery 59 and a central opening 60. The Ring 58 is made of a magnetizable material, for example, a ferrous material. The ring 58 serves to direct the magnetic flux generated by the permanent magnets 34.

Referring now to FIG. 5B, in yet another aspect, the axial flux motor 10 may be provided wherein rotor assembly 18 includes rotor poles 19B that form pockets 31B in which magnets 34B do not extend to second rotor face 41B. Resin 39B may be positioned in pockets 31B between the magnets 34B and the second rotor face 41B.

While the axial flux motor of the present invention may be provided with poles that are generally rectangular, other shapes are anticipated and may function similarly. The use of rectangular poles provides for more simple manufacturing and assembly. For rectangular or square poles, each lamination forming the poles may be identical to each other. The laminations may be stamped from a coil of material, for example steel. The laminations may be randomly assembled to form poles, since each lamination may be identical to each other.

Figure 6:
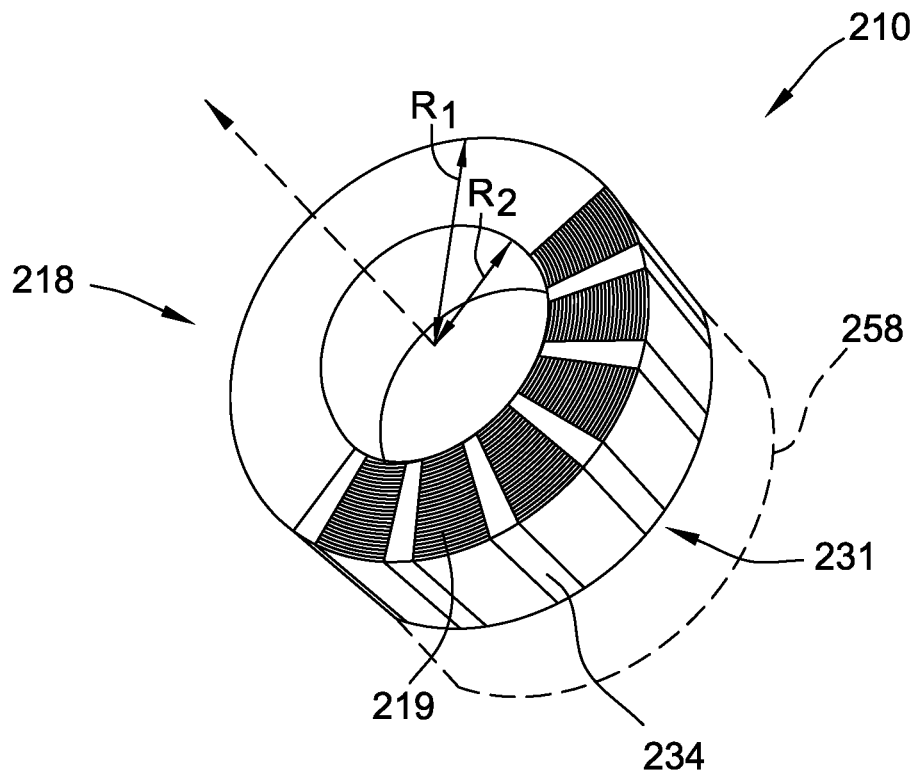
FIG. 6 is a perspective view of another embodiment of the present invention in the form of a rotor that may be used in an axial flux machine and having pie shaped poles and rectangular magnets.
Figure 6B:
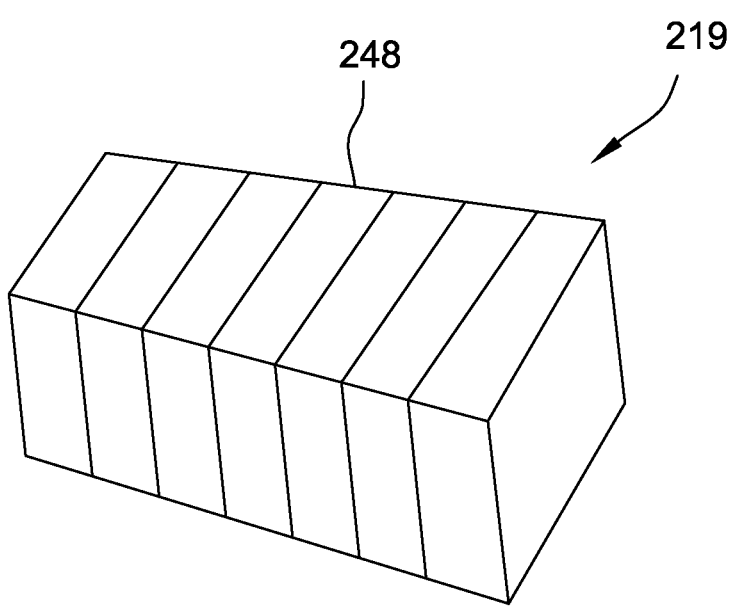
FIG. 6B is a perspective view of a pole used in the rotor of FIG. 6.
Figure 6A:
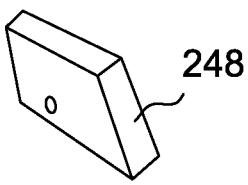
FIG. 6a is a perspective view of a magnet used in the rotor of FIG. 6.

As shown in FIGS. 6, 6A and 6B, a motor 210 may be provided with a rotor assembly 218 having poles 219 with a trapezoidal or pie-shape. In such a configuration, the motor 210 may include rectangular magnets 234 that may be square. It should be appreciated that the magnets may likewise be trapezoidal or pie-shaped with the included angle of the pie-shaped pieces being less if both the magnets and the poles have trapezoidal or pie shapes.

The trapezoidal poles 219 include laminations 248 made of progressively increasing lengths. Each lamination 248 in each pole 219 is made of a different length and the laminations need to be assembled with each lamination being of progressively increasing length. Such a pole 219 may be significantly more expensive to manufacture.

The rotor assembly 218 may include a backing ring or disc 258 similar to ring 58 of the rotor assembly 18 of FIG. 4.

Figure 7:
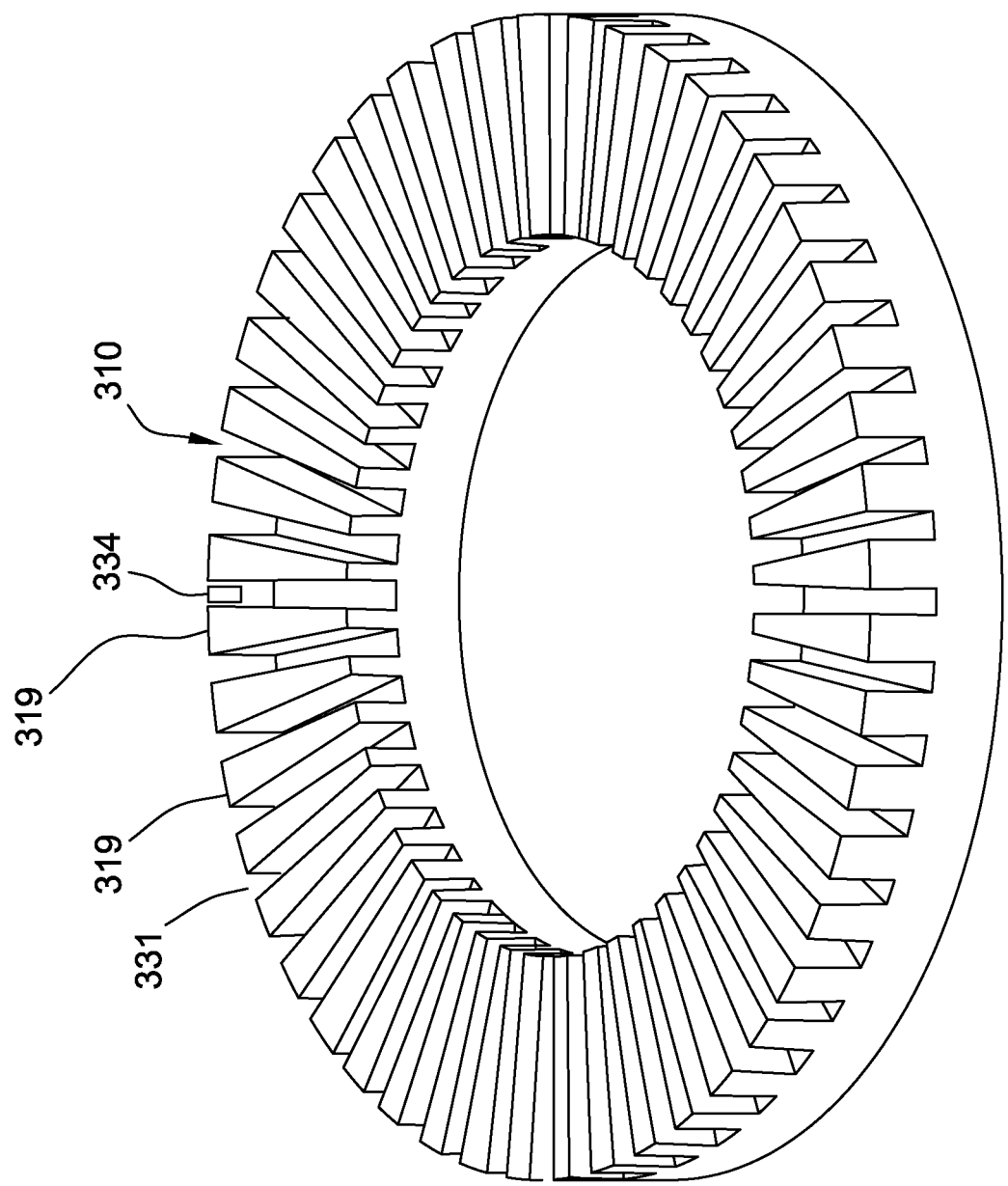
FIG. 7 is a perspective view of another exemplary stator, having been made from a roll of metal and that may be utilized with the axial flux rotor according to the present invention.

According to yet another aspect and referring now to FIG. 7, an axial flux motor 310 may be provided wherein a rotor assembly 318 includes poles 319 formed from the plurality of layers wound into a ring shaped rotor core 330 from a unitary ferrous sheet. The sheet has notches or pockets 331 formed in a spaced apart arrangement in the sheet. The sheet is wrapped in a circular form to form the rotor core 330. Magnets 334 are positioned in the pockets 331.

The rotor core 330 may be manufactured in a punch and wind machine such as a machine more fully described in U.S. Pat. No. 7,654,123 B2, hereby incorporated in its entirety by reference.

Referring again to FIG. 2 and FIG. 3, the stator assembly 24 may generally include a plurality of stator modules 84, a bobbin assembly 86, and a control board 88. Stator assembly 24 is coupled to a stator housing 90 (shown in FIG. 2) to form a packed stator 92. Stator assembly 24 may also include a plurality of tooth tips 94.

Figure 3:
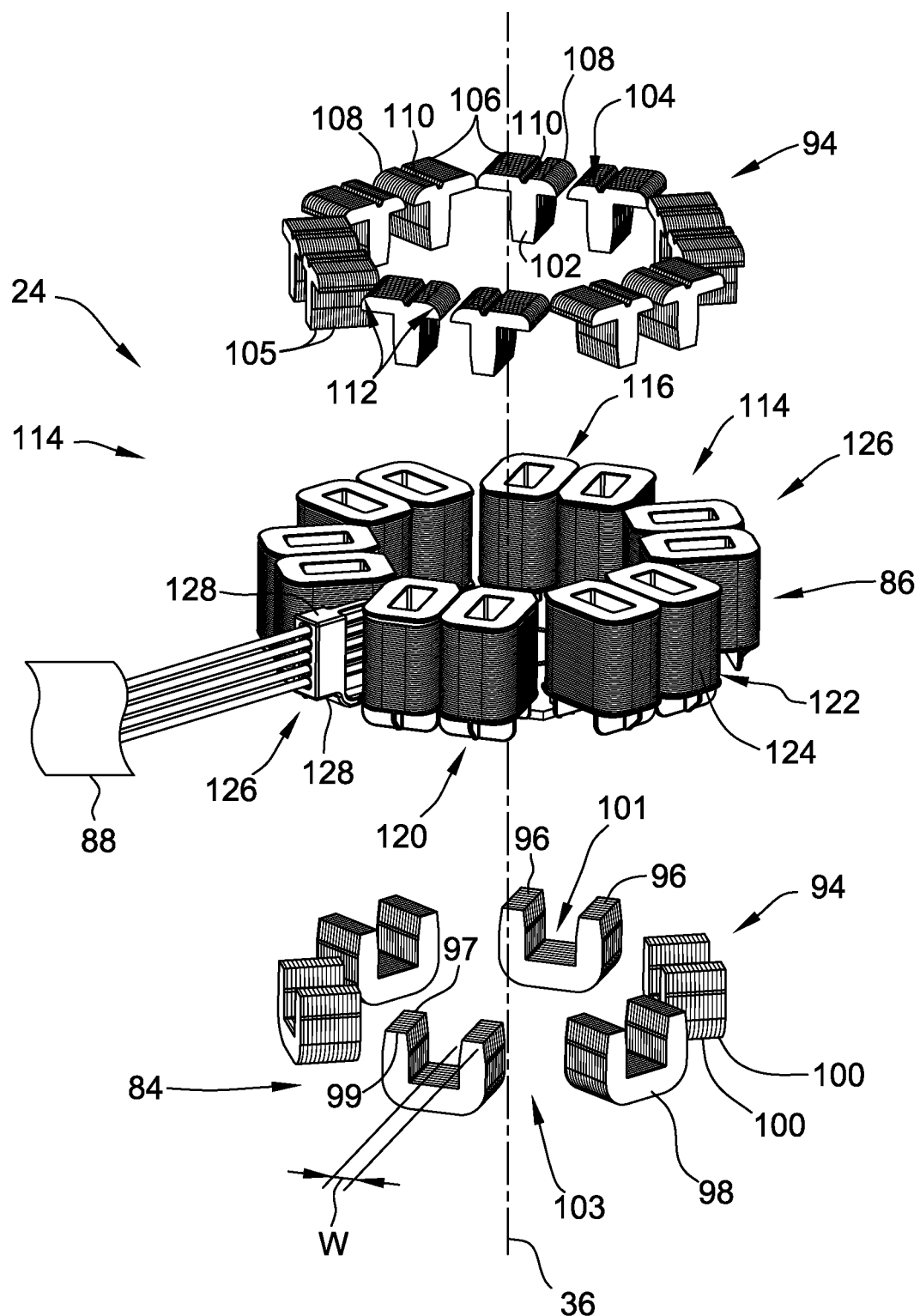
FIG. 3 is an exploded view of the stator of the axial flux machine shown in FIGS. 1 and 2.

As shown in FIG. 2 and FIG. 3, stator assembly 24 is a multiphase (more than one phase) axial flux stator, and is preferably a three-phase axial flux stator producing flux in the axial direction (i.e., parallel to axis of rotation 36). Stator modules 84 are generally C-shaped and include a pair of teeth 96 connected by a yoke section 98. In the exemplary embodiment, stator modules 84 are oriented in a generally axial direction such that teeth 96 extend substantially parallel to axis of rotation 36. Moreover, stator modules 84 are fabricated from a plurality of stacked laminated sheets 100. Such a construction simplifies the manufacturing process and enables modular stator modules 84 to be produced quickly and efficiently.

FIG. 2 and FIG. 3 show perspective views of exemplary bobbin assembly 86 that may be included within electric machine 10. Bobbin assembly 86 generally includes a plurality of bobbins 114 coupled to control board 88. Although twelve bobbins 114 are illustrated, bobbin assembly 86 may include any number of bobbins that enables machine 10 to function as described herein. Each bobbin 114 includes an opening 116 that closely conforms to an external shape of stator module teeth 96 and tooth tip axial member 102. For example, stator module tooth 96 is configured to be positioned at least partially within a first end 118 of opening 116, and tooth tip axial member 102 is configured to be positioned at least partially within a second end 120 of opening 116. Machine 10 may include one bobbin 114 for every tooth 96, one bobbin 114 positioned on every other tooth 96, and/or one bobbin 114 positioned on yoke section 98.

FIG. 2 is a perspective view of the bobbin 114 that may be included in bobbin assembly 86. In the exemplary embodiment, bobbin assembly 86 also includes electrical winding 122 that includes a plurality of coils 124. In the exemplary embodiment, winding 122 is made up of twelve coils 124 and creates a twelve-pole stator. Each coil 124 is wound around a respective bobbin 114, which electrically isolates coil 124 from stator module 84 and tooth tip 94. Alternatively, each coil is directly wound in a generally vertical direction (i.e., generally parallel to rotation axis 36) around at least one of stator module teeth 96 and tooth tip axial member 102, and/or directly wound in a generally horizontal direction (i.e., generally orthogonal to rotation axis 36) around yoke section 98.

In the exemplary embodiment, coils 124 are wound around bobbins 114, and each coil 124 includes two ends, a start and a finish to the coil. Bobbins 114 are coupled to control board 88 by pins 126. In the exemplary embodiment, control board 88 is a printed circuit board (PCB), and each end of each of coil 124 is coupled to control board 88 using an insulation displacement terminal (not shown) designed for directly soldering into control board 88. Alternatively, any other suitable connector may be used that enables the plurality of bobbins 114 to be coupled to control board 88. In the exemplary embodiment, control board 88 includes a wiring connector 128 for directly connecting control board 88 to a motor control board (not shown). In an alternative embodiment, control board 88 is incorporated within a motor control board, thereby eliminating redundant mounting and connectors.

Teeth 96 have the substantially same width w from an inner edge 97 to an outer edge 99. That is, width w of teeth 96 do not diverge from inner edge 97 to outer edge 99 like in some known stators. This enables laminated sheets 100 to be substantially identical, which lowers manufacturing costs. Further, stator modules 84 are separated from each other and oriented such that adjacent teeth 96 form alternating parallel gaps 101 and angular gaps 103. Alternatively, stator modules 84 may be solid.

In the exemplary embodiment, tooth tips 94 are generally T-shaped and include an axial member 102 and a cross member 104. Each cross member 104 includes an inward extending portion 106, an outward extending portion 108, and a groove 110. In the exemplary embodiment, tooth tips 94 are fabricated from a plurality of stacked laminated sheets 105. Such a construction simplifies the manufacturing process and enables modular tooth tips 94 to be produced quickly and efficiently. In the exemplary embodiment, outward extending portion 108 has a greater length than inward extending portion 106. Tooth tips 94 also include rounded portions 112 to reduce noise by reducing the harmonic content of the back electromagnetic field (EMF) and cogging torque. Tooth tips 94 are generally aligned with a corresponding tooth 96 and increase flux density in stator assembly 24 and reduce the length of a winding 122) needed for assembly 24.

According to embodiments of the present invention, the rotor may be provided with permanent magnets that are made of a permanently magnetizable material that has been magnetized prior the assembly of the magnets into the rotor. The magnetized magnets when being assembled into the assembly of such a rotor have an affinity to material that is magnetically attracted, for example ferrous materials. Typically portions of the stator core, including the stator core and portions of the rotor, including the rotor poles are made of ferrous materials. Also, the motor housing, the motor bearings and the motor shaft are typically made of ferrous materials. The attraction of the magnets to these ferrous materials makes assembly very difficult.

The applicant has discovered that assembly of the motor, particularly the assembly of the motor rotor is much easier if the motor rotor is performed with non-magnetized rotor magnets. The applicant has discovered that the magnets within the assembled motor rotor may in fact be magnetized after rotor assembly, if a proper device for such magnetization is provided.

Figure 8:
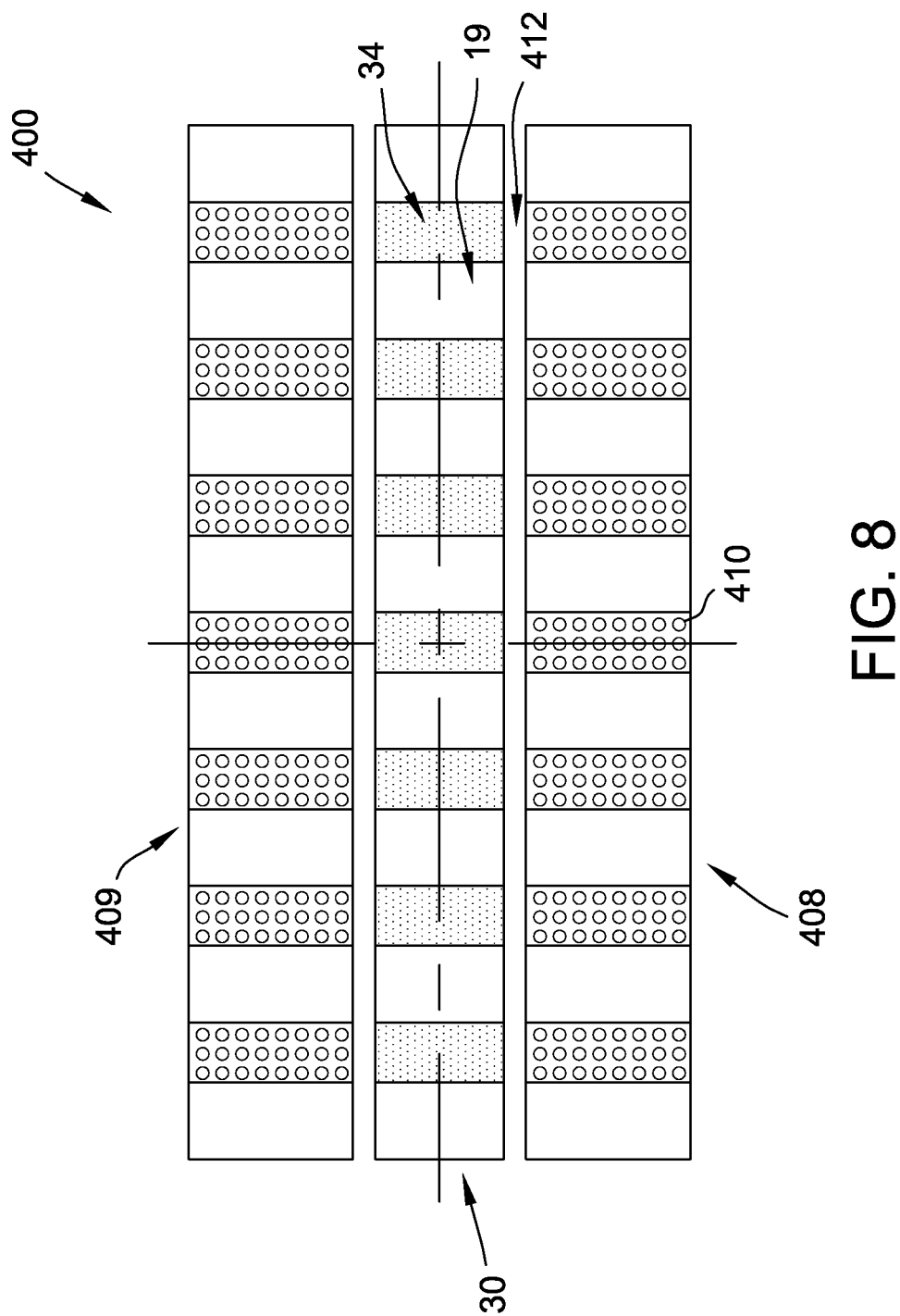
FIG. 8 is s partial cross sectional view of a magnetizing device with the rotor of FIG. 4 positioned in the magnetizing device.

Referring now to FIG. 8, a fixture or device 400 for proving such magnetizing of a magnetizable material, the need of which is described above, is provided. The fixture 400 may be capable of magnetizing any magnetizable permanent magnet including, for example, a ferrite magnet, a bonded neodymium magnet and a sinter neodymium magnet. It should be appreciated that the fixture 400 may be designed, customized or adjusted to optimally magnetized a particular magnet material of a particular shape.

For use with, for example the rotor 30 as shown in FIGS. 1-5, the fixture 400 may include a pocket or cavity 402 for receiving the rotor 30. The fixture 400 is designed to permanently magnetize the magnets 34 after they have been assembled onto the rotor 30. The pocket 402 may include an inner periphery 204 for cooperation with the outer periphery 43 of the rotor 30. The pocket 402 may also include a locating surface 406 for received end face 41 of rotor 30. The rotor 30 may include a central shaft 32 and the fixture 400 may include a central opening (not shown) for receiving the central shaft 32.

The fixture 400 contains magnetizing coils 410 for generating an electromagnetic field when electrical current is applied to the coils 410. While the fixture 400 may be capable of magnetizing the coils 410 if they are merely located adjacent to the magnets 34, optimum placement of the coils 410 with respect to the magnets 34 will provide for more efficient and complete magnetizing of the magnets 34.

Such magnetizing coils are powered by an electrical current supply, for example 110/130 V AC or 210/230 V AC single phase power or by a three phase AC power supply. Circuitry to energize such coils is well known.

Figure 9:
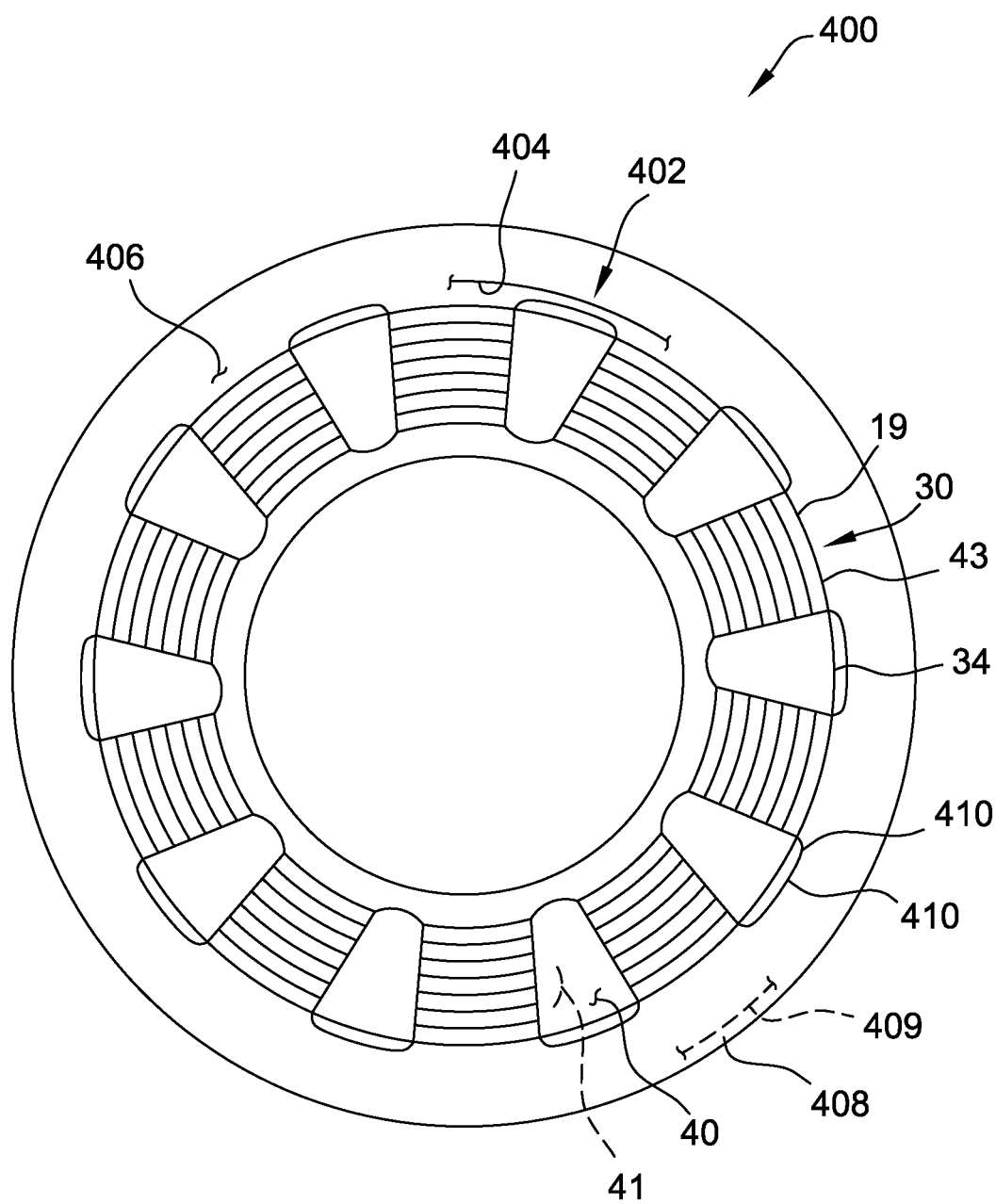
FIG. 9 is s plan view of the magnetizing device of FIG. 8 with the rotor of FIG. 4 positioned in the magnetizing device.

As shown in FIG. 8 and FIG. 9, preferably coils 410 are placed both against the first face 40 of the rotor and against the second face 41 of the rotor 30. As shown in FIG. 8 and FIG. 9, the fixture 410 include a top magnetizing fixture 408 adjacent first face 40 of magnet 34 and a bottom magnetizing fixture 409 adjacent the second face 41 of magnet 34. The fixtures 408 and 409 may be similar and each fixture 408,409 include a coil 410 corresponding to each of the magnets 34 which coils 410 are positioned directly in line with the magnets 34.

As shown, a separate coil 410 is placed against (or spaced from) each of the magnets 34. It should be appreciated that a spacer 412 may be positioned between the faces 40 and 41 of the magnets 34 and the coils 410. The spacer 412 may serve to protect the coils and the magnets and to insulate the magnets from the coils. The spacer 412 may merely be an air gap between the magnets 34 and the coils 410.

Note that a solitary coil 410 may alternately be placed on each of the faces 40 and 41 of the magnets 34, but doing so will limit the flux pattern that may be formed by the coils 410.

The coils 410, particularly when a separate coil 410 is placed adjacent each face 40, 41 of the magnet 34, may generate a permanent magnetic flux pattern that is optimum for the motor rotor 30.

Figure 10:
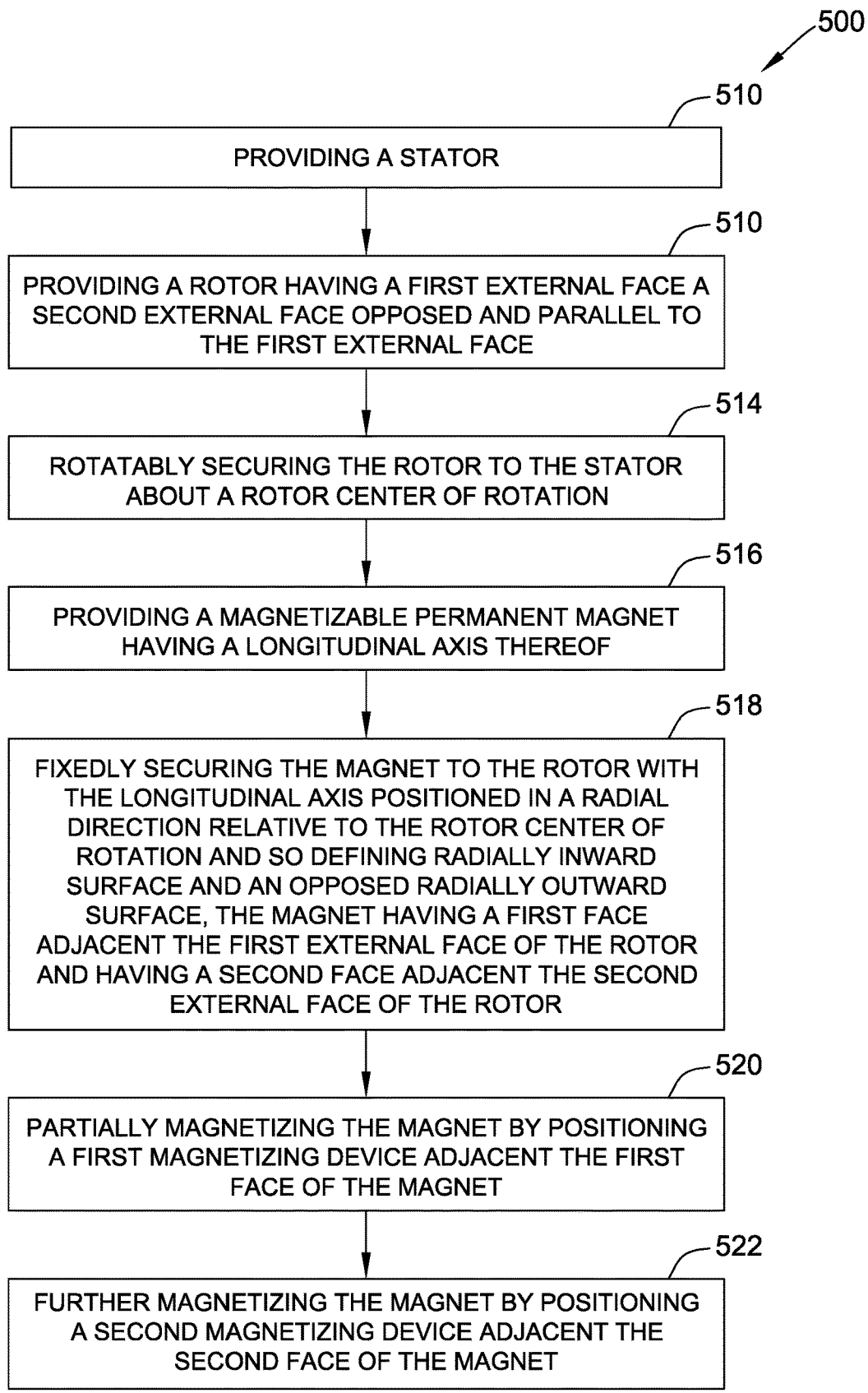
FIG. 10 is a flow chart of an exemplary method according to the present invention.

Referring now to FIG. 10 and according to another embodiment of the present invention, a method 500 is provided. The method 500 includes step 510 of providing a stator and step 512 of providing a rotor. The method 500 includes step 514 of rotatably securing the rotor to the stator about a rotor center of rotation. The method 500 also includes step 516 of providing a magnetizable permanent magnet having a longitudinal axis thereof. The method 500 includes step 518 of fixedly securing the magnet to the rotor with the longitudinal axis positioned in a radial direction relative to the rotor center of rotation and so defining radially inward surface and an opposed radially outward surface, the magnet having a first face adjacent the first external face of the rotor and having a second face adjacent the second external face of the rotor. The method 500 also includes step 520 of partially magnetizing the magnet by positioning a first magnetizing device adjacent the first face of the magnet. The method 500 further includes step 522 of magnetizing the magnet by positioning a second magnetizing device adjacent the second face of the magnet.

In another aspect of method 500, the axial flux rotor may be provided wherein the step 512 of providing a rotor includes the step of providing a body having an outer periphery limited by an outside radius OR. The body further has a central opening limited by an inner radius IR. The step of providing a body includes stamping a plurality of laminations. Each of the plurality of laminations including opposed parallel external planar faces and opposed first and second ends. The step of providing a body also includes overlying one of the external planar faces of one of the plurality of laminations over one of the external planar faces of another of the plurality of laminations.

The step of providing a body also includes repeating the overlying step above to provide a rotor pole. The step of providing a body also includes positioning the rotor poles in a spaced apart relationship with the opposed first and second ends of the laminations tangentially oriented with respect to the rotor center of rotation. The opposed first and second ends define the outside radius OR and the inside radius IR, respectively.

In another aspect, the axial flux rotor may be provided wherein the step of providing a body further includes overmolding rotor poles with a moldable material after positioning the rotor poles in the spaced apart relationship.

In yet another aspect of method 500, the axial flux rotor may be provided wherein the step 516 of providing a magnetizable permanent magnet includes providing one of a ferrite magnet, a bonded neodymium magnet and a sinter neodymium magnet.

In yet another aspect of method 500, the axial flux rotor may be provided wherein the step 516 of providing a magnetizable permanent magnet further including the step of providing a second magnetizable permanent magnet having a longitudinal axis thereof and the step of fixedly securing the second magnetizable permanent magnet to the rotor with the longitudinal axis positioned in a radial direction relative to the rotor center of rotation and so defining a second magnet radially inward surface and an opposed second magnet radially outward surface. The second magnet may have a first face adjacent the first external face of the rotor and may have a second face adjacent the second external face of the rotor.

In yet another aspect, the axial flux rotor may be provided further including the step of partially magnetizing the second magnet by positioning the first magnetizing device adjacent the first face of the second magnet and the step of further magnetizing the second magnet by positioning the second magnetizing device adjacent the second face of the second magnet.

In yet another aspect of method 500, the axial flux rotor may be provided wherein the step 516 of providing a magnetizable permanent magnet having a longitudinal axis thereof includes providing a plurality of magnetizable permanent magnets, each of the plurality of magnetizable permanent magnets having a longitudinal axis thereof;

In yet another aspect of method 500, the axial flux rotor may be provided wherein the step 518 of fixedly securing the magnet to the rotor includes fixedly securing each of the plurality of magnetizable permanent magnets to the rotor with the longitudinal axis of each of the plurality of magnetizable permanent magnets positioned in a radial direction relative to the rotor center of rotation and so defining a radially inward surface and an opposed radially outward surface of each of the plurality of magnetizable permanent magnets. Each of the plurality of magnetizable permanent magnets may have a first face adjacent the first external face of the rotor and may have a second face adjacent the second external face of the rotor.

In yet another aspect of method 500, the axial flux rotor may be provided wherein the step 520 of partially magnetizing the magnet includes positioning the first magnetizing device adjacent the first face of each of the plurality of magnetizable permanent magnets and wherein the step of further magnetizing the magnet includes positioning the second magnetizing device adjacent the second face of each of the plurality of magnetizable permanent magnets.

In yet another aspect of method 500, the axial flux rotor may be provided wherein the step 516 of providing a magnetizable permanent magnet includes providing an axially imbedded magnet having a minimum depth defined by the equation $$D_{min} = \frac{\pi * (OR + IR)}{2 * N * BrA} * BrS,$$

wherein BrS is the Remnant Flux Density of Surface Mounted Magnet, wherein OR is the outside radius of the body, wherein IR is the inner radius of the body, wherein N is the number of rotor poles, and wherein BrA is the Remnant Flux Density of Axially Imbedded Magnet.

In yet another aspect of method 500, the axial flux rotor may be provided wherein the step 516 of providing a magnetizable permanent magnet includes providing a magnetizable ring/dise positioned proximate one of the first and second opposed faces, the ring defines an outer periphery and a central opening In yet another aspect of method 500, the axial flux rotor may be provided wherein the step 512 of providing a rotor includes the step of providing a body having an outer periphery limited by an outside radius OR.

In yet another aspect of method 500, the axial flux rotor may be provided wherein the body further has a central opening limited by an inner radius IR.

In yet another aspect of method 500, the axial flux rotor may be provided wherein, the step of providing a body includes providing a sheet of ferrous material, punching spaced apart openings in the sheet, and wrapping the sheet in a circular form to form a laminated rotor core while aligning some of the spaced apart opening to provide cavities for receiving the magnets and to provide rotor poles in a spaced apart relationship with the opposed parallel external faces of the laminations tangentially oriented with respect to the rotor center of rotation. The external faces define the outside radius OR and the inside radius IR.

Figure 11:
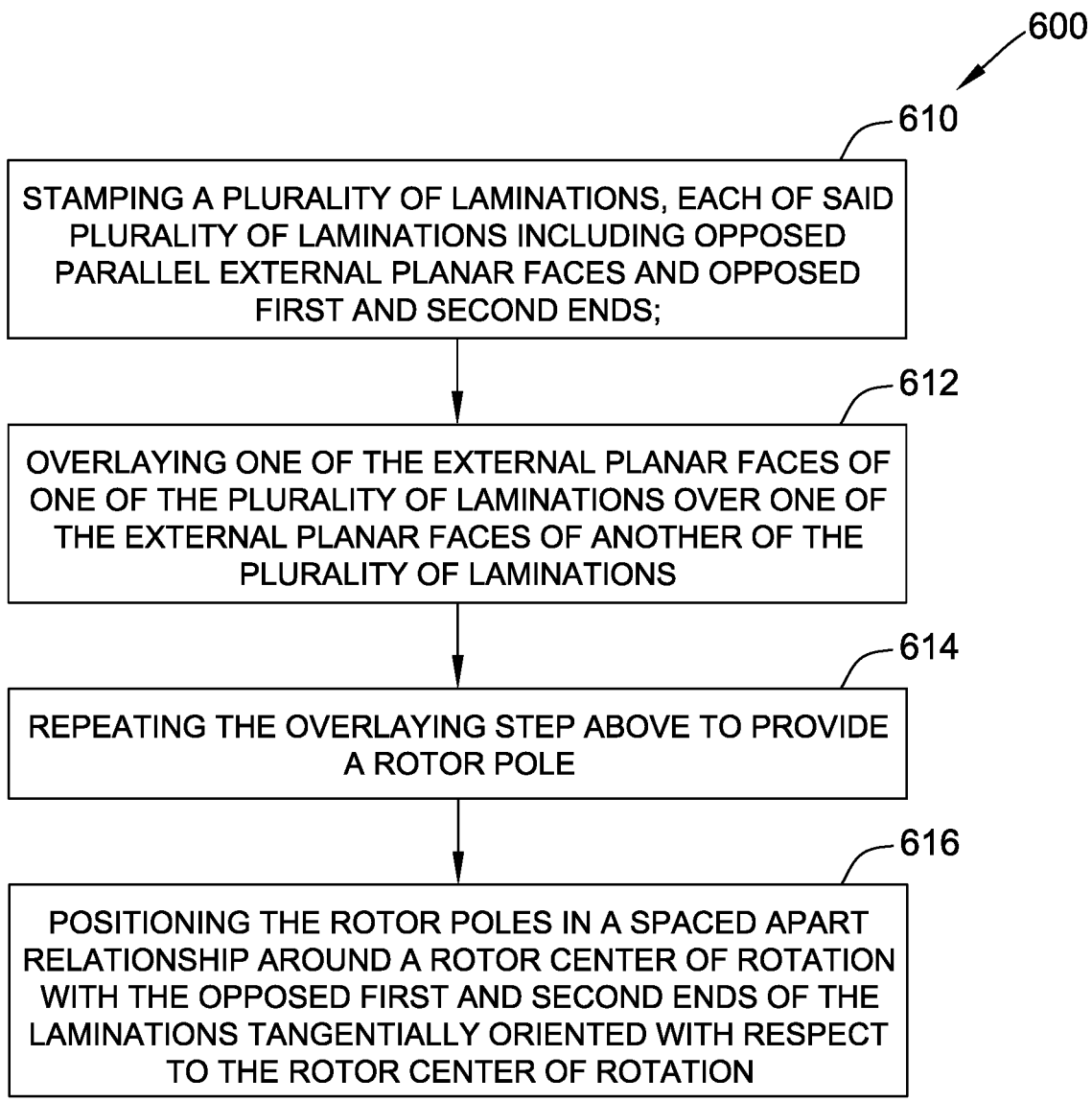
FIG. 11 is a flow chart of another exemplary method according to the present invention.

Referring now to FIG. 11 and according to another embodiment of the present invention, a method 600 is provided. The method 600 is utilized for manufacturing an axial flux rotor. The method includes step 610 of stamping a plurality of laminations and step 612 of overlying one of the external planar faces of one of the plurality of laminations over one of the external planar faces of another of the plurality of laminations. Each of the plurality of laminations includes opposed parallel external planar faces and opposed first and second ends. The method also includes overlying one of the external planar faces of one of the plurality of laminations over one of the external planar faces of another of the plurality of laminations. The method also includes step 614 of repeating the overlying step above to provide a rotor pole and the step 616 of positioning the rotor poles in a spaced apart relationship around a rotor center of rotation with the opposed first and second ends of the laminations tangentially oriented with respect to the rotor center of rotation.

In yet another aspect, the method may further include the steps of providing a plurality of magnetizable permanent magnets, each magnet having a longitudinal axis thereof and positioning each of the magnets between adjacent rotor poles with the longitudinal axis positioned in a radial direction relative to the rotor center of rotation and so defining radially inward surface and an opposed radially outward surface. The magnet has a first face adjacent the first external face of the rotor and has a second face adjacent the second external face of the rotor.

In yet another aspect, the method may further include the step of overmolding the rotor poles with a moldable material after positioning the rotor poles in the spaced apart relationship.

In yet another aspect, the method may further include the steps of partially magnetizing the magnet by positioning a first magnetizing device adjacent the first face of the magnet and further magnetizing the magnet by positioning a second magnetizing device adjacent the second face of the magnet.

In yet another aspect, the method may be provided wherein the step of providing a plurality of magnetizable permanent magnets includes providing one of ferrite magnets, bonded neodymium magnets and sintered neodymium magnets.

In yet another aspect, the method 600 may be provided wherein the step 616 of positioning the rotor poles in a spaced apart relationship includes positioning each of the plurality of laminations such that the laminations form a body have an outer periphery defined by an outside radius OR, and a central opening defined by an inner radius IR.

In yet another aspect, the method may be provided wherein the step of providing a magnetizable permanent magnet includes providing a magnet having a minimum length defined by the equation $$D_{min} = \frac{\pi * (OR + IR)}{2 * N * BrA} * BrS,$$

wherein BrS is the Remnant Flux Density of Surface Mounted Magnet, wherein OR is the outside radius of the body, wherein IR is the inner radius of the body, wherein N is the number of rotor poles, and wherein BrA is the Remnant Flux Density of Axially Imbedded Magnet.

In yet another aspect, the method may further include the step of providing a magnetizable ring/disc positioned proximate one of the first and second opposed faces. The ring defines an outer periphery and a central opening.

Figure 12A:
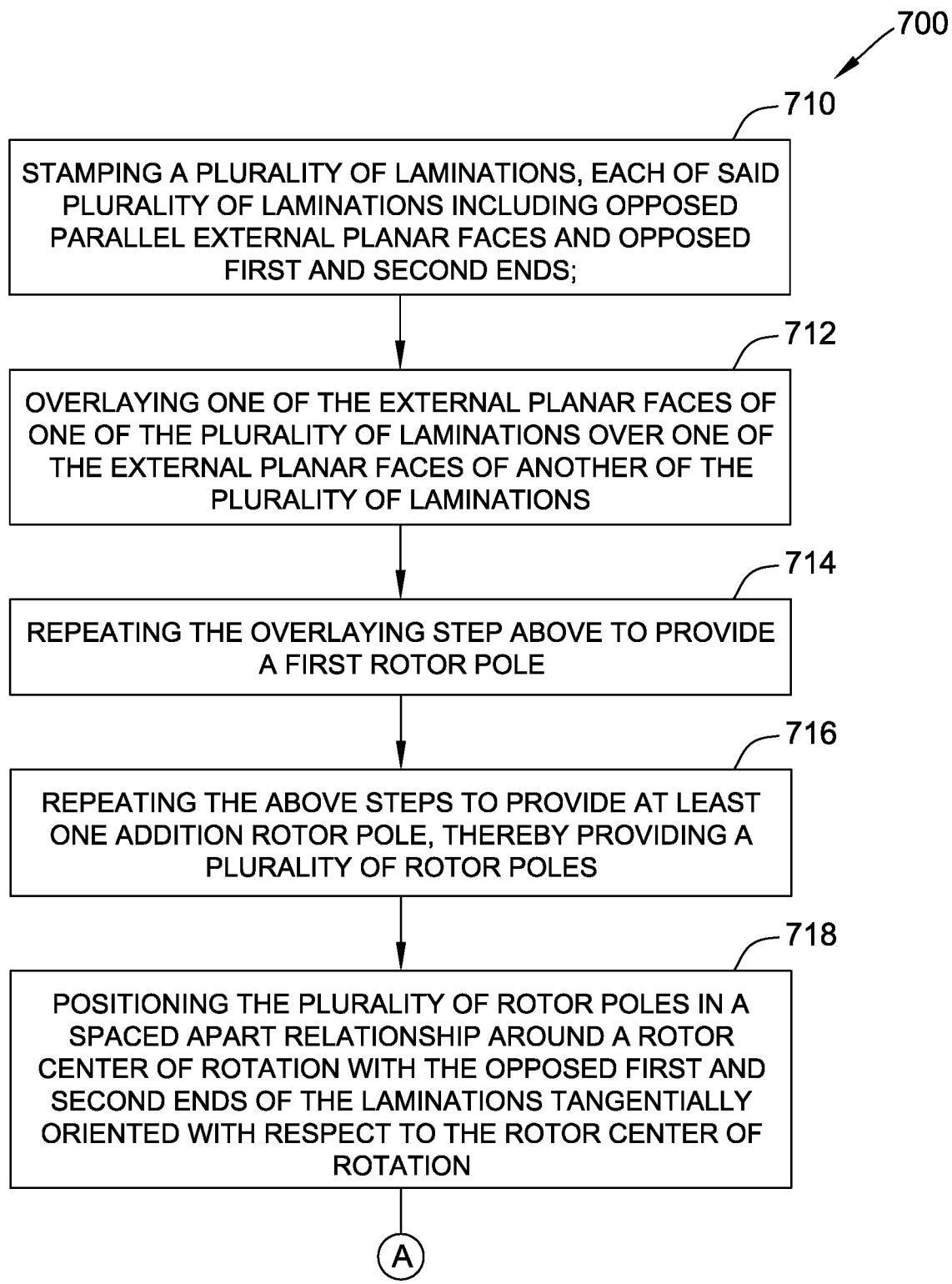
FIG. 12A is a first portion of a flow chart of a method for making an article for an exemplary article according to the present invention.
Figure 12B:
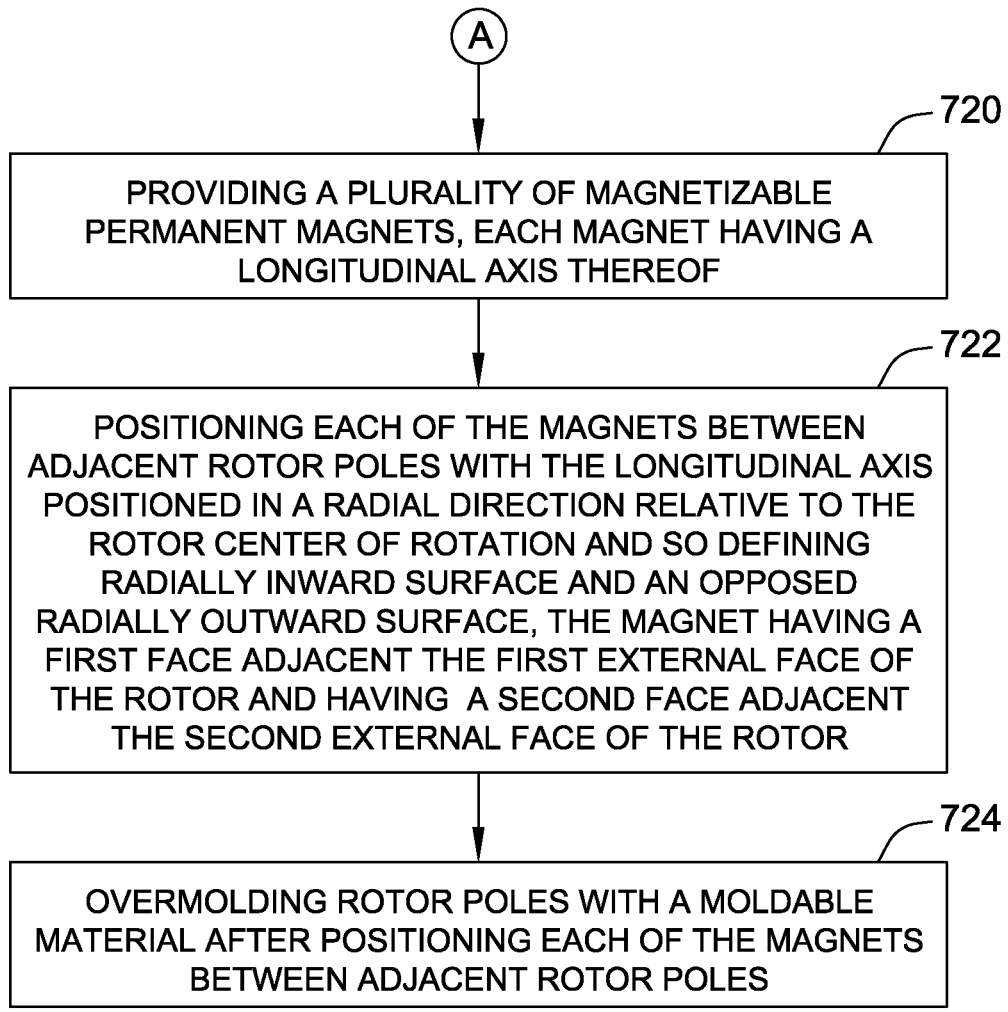
FIG. 12B is a second portion of the flow chart of the method for making an article of FIG. 12 for an exemplary article according to the present invention.

Referring now to FIGS. 12A and 12B and according to another embodiment of the present invention, a process 700 is provided. The process 700 is for preparing an axial flux motor by the provided. The process 700 includes the step 710 of stamping a plurality of laminations and step 712 of overlying one of the external planar faces of one of the plurality of laminations over one of the external planar faces of another of the plurality of laminations. Each of the plurality of laminations includes opposed parallel external planar faces and opposed first and second ends. The process 700 also includes step 714 of repeating the overlying step above to provide a first rotor pole and step 716 of repeating the above steps to provide at least one addition rotor pole, thereby providing a plurality of rotor poles. The process 700 also includes step 718 of positioning the plurality of rotor poles in a spaced apart relationship around a rotor center of rotation with the opposed first and second ends of the laminations tangentially oriented with respect to the rotor center of rotation and step 720 of providing a plurality of magnetizable permanent magnets, each magnet having a longitudinal axis thereof. The process 700 also includes step 722 of positioning each of the magnets between adjacent rotor poles with the longitudinal axis positioned in a radial direction relative to the rotor center of rotation and so defining radially inward surface and an opposed radially outward surface, the magnet having a first face adjacent the first external face of the rotor and having a second face adjacent the second external face of the rotor. The process 700 also includes step 724 of overmolding rotor poles with a moldable material after positioning each of the magnets between adjacent rotor poles.

In yet another aspect, the process 700 may be provided wherein step 718 of positioning the rotor poles in a spaced apart relationship include providing positioning the rotor poles in a spaced apart relationship to form a body having an outer periphery defined by an outside radius OR, having and a central opening defined by an inner radius IR and wherein the step of providing a plurality of magnetizable permanent magnets includes providing a providing a plurality of magnetizable permanent magnets, each magnet having a minimum length defined by defined by the equation $$D_{min} = \frac{\pi * (OR + IR)}{2 * N * BrA} * BrS,$$

wherein BrS is the Remnant Flux Density of Surface Mounted Magnet, wherein OR is the outside radius of the body, wherein IR is the inner radius of the body, wherein N is the number of rotor poles, and wherein BrA is the Remnant Flux Density of Axially Imbedded Magnet.

In yet another aspect, the process may further include the step of providing a magnetizable ring/disc positioned proximate one of the first and second opposed faces. The ring defines an outer periphery and a central opening.

Described herein are exemplary methods and systems for axial flux machines. The axial flux machines include a rotor having axially embedded permanent magnets. The axially embedded rotor design enables the use of lower-cost ferrite magnets, while achieving the power densities and higher efficiency of other rotor designs that use higher-cost neodymium magnets. Further, the use of a permanent magnet fixture with coils to permanently magnetize an assembled rotor provides for the easier assembly of a non-magnetized magnet into a rotor assembly.

Further, the axial flux machines include a multiphase stator having substantially similar stator modules and substantially similar tooth tips made from economical laminations, which enables a modular construction. The stator module teeth are substantially similar and have the substantially same width such that the fabrication processes is simplified and hastened, and no togging torque is created. The tooth tips increase flux concentration and reduce noise. Accordingly, a lower-cost, axial flux machine is described herein that provides quicker production with minimal impact on efficiency and performance.

Exemplary embodiments of the axial flux electric machine assembly are described above in detail. The electric machine and its components are not limited to the specific embodiments described herein, but rather, components of the systems may be utilized independently and separately from other components described herein. For example, the components may also be used in combination with other machine systems, methods, and apparatuses, and are not limited to practice with only the systems and apparatus as described herein. Rather, the exemplary embodiments can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of manufacturing an axial flux motor, said method comprising:
   providing a stator;
   providing a rotor having a first external face and a second external face opposed and parallel to the first external face;
   rotatably securing the rotor to the stator about a rotor center of rotation;
   providing a plurality of magnetizable permanent magnets that each include a longitudinal axis thereof;
   fixedly securing each magnetizable permanent magnet to the rotor with the each longitudinal axis positioned in a radial direction relative to the rotor center of rotation and so defining a radially inward surface and an opposed radially outward surface of each of the plurality of magnetizable permanent magnets, each of the plurality of the magnetizable permanent magnets having a first face adjacent the first external face of the rotor and having a second face adjacent the second external face of the rotor;
   partially magnetizing the magnetizable permanent magnet by positioning a first magnetizing device (408) adjacent the first face (40) of each of the plurality of magnetizable permanent magnets; and
   further magnetizing the magnetizable permanent magnet by positioning a second magnetizing device (409) adjacent the second face (41) of each of the plurality of magnetizable permanent magnets.

2. The method of claim 1, wherein the step of providing a rotor further comprises the step of providing a body having an outer periphery limited by an outside radius (OR), the body further has a central opening limited by an inner radius (IR), the step of providing a body including:
   stamping a plurality of laminations, each of said plurality of laminations including opposed parallel external planar faces and opposed first and second ends;
   overlying one of the external planar faces of one of the plurality of laminations over one of the external planar faces of another of the plurality of laminations;
   repeating the overlying step above to provide a rotor pole; and
   positioning the rotor poles in a spaced apart relationship with the opposed first and second ends of the laminations tangentially oriented with respect to the rotor center of rotation, the opposed first and second ends defining the outside radius (OR) and the inside radius (IR), respectively.

3. The method of claim 2, wherein the step of providing a body further includes overmolding rotor poles with a moldable material after positioning the rotor poles in the spaced apart relationship.

4. The method of claim 1, wherein the step of providing a plurality of magnetizable permanent magnets comprises providing a plurality of one of ferrite magnets, bonded neodymium magnets, and sinter neodymium magnets.

5. The method of claim 1:
   further comprising providing a second magnetizable permanent magnet having a longitudinal axis thereof;
   fixedly securing the second magnetizable permanent magnet to the rotor with the longitudinal axis positioned in a radial direction relative to the rotor center of rotation and so defining a second magnet radially inward surface and an opposed second magnet radially outward surface, the second magnet having a first face adjacent the first external face of the rotor and having a second face adjacent the second external face of the rotor;
   partially magnetizing the second magnet by positioning the first magnetizing device adjacent the first face of the second magnet; and
   further magnetizing the second magnet by positioning the second magnetizing device adjacent the second face of the second magnet.

6. The method of claim 1, wherein the step of providing a plurality of magnetizable permanent magnets comprises providing a plurality of axially imbedded magnets having a minimum depth defined by the equation $$D_{min} = \frac{\pi * (OR + IR)}{2 * N * BrA} * BrS,$$

wherein BrS is the Remnant Flux Density of Surface Mounted Magnet, wherein OR is the outside radius of the body, wherein IR is the inner radius of the body, wherein N is the number of rotor poles, and wherein BrA is the Remnant Flux Density of Axially Imbedded Magnet.

7. The method of claim 1, wherein step of providing a plurality of magnetizable permanent magnets comprises providing a magnetizable ring positioned proximate one of the first and second opposed faces, the ring defines an outer periphery and a central opening.

8. The method of claim 1, wherein the step of providing a rotor comprises the step of providing a body having an outer periphery limited by an outside radius (OR), the body further has a central opening limited by an inner radius (IR), the step of providing a body including:
   providing a sheet of ferrous material;
   punching spaced apart openings in the sheet; and
   wrapping the sheet in a circular form to form a laminated rotor core while aligning some of the spaced apart opening to provide cavities for receiving the magnetizable permanent magnets and to provide rotor poles in a spaced apart relationship with the opposed parallel external faces of the laminations tangentially oriented with respect to the rotor center of rotation, the external faces defining the outside radius (OR) and the inside radius (IR).

* * * * *